United States Patent
Ilea et al.

(10) Patent No.: US 10,731,388 B2
(45) Date of Patent: Aug. 4, 2020

(54) LATCH WITH DOUBLE PULL FOR CLOSURE PANEL

(71) Applicant: Magna Closures Inc., Newmarket (CA)

(72) Inventors: Ioan Dorin Ilea, Vaughan (CA); James J. Ferri, Maple (CA); Srinivas Rao, Aurora (CA); John Distefano, Richmond Hill (CA)

( * ) Notice: Subject to any disclaimer, the term of this patent is extended or adjusted under 35 U.S.C. 154(b) by 1029 days.

(21) Appl. No.: 14/828,606

(22) Filed: Aug. 18, 2015

(65) Prior Publication Data
US 2016/0076279 A1 Mar. 17, 2016

Related U.S. Application Data

(60) Provisional application No. 62/051,580, filed on Sep. 17, 2014.

(51) Int. Cl.
| | |
|---|---|
| *E05B 83/24* | (2014.01) |
| *B60J 7/20* | (2006.01) |
| *E05B 77/08* | (2014.01) |

(52) U.S. Cl.
CPC ............... *E05B 83/24* (2013.01); *B60J 7/201* (2013.01); *B60J 7/206* (2013.01); *E05B 77/08* (2013.01);
(Continued)

(58) Field of Classification Search
CPC ...... E05B 83/24; E05B 83/243; E05B 83/247; E05B 77/08; Y10T 292/1092;
(Continued)

(56) References Cited

U.S. PATENT DOCUMENTS

| | | | | |
|---|---|---|---|---|
| 4,961,601 A | * | 10/1990 | Lindholm | E05B 83/16 292/216 |
| 5,150,933 A | * | 9/1992 | Myslicki | E05B 83/16 292/216 |

(Continued)

FOREIGN PATENT DOCUMENTS

| | | |
|---|---|---|
| CN | 1751164 A | 3/2006 |
| DE | 102007008700 A1 | 8/2008 |

(Continued)

OTHER PUBLICATIONS

Chinese Office Action, dated Sep. 26, 2018, in related Chinese Application No. 201510586775.6.

*Primary Examiner* — Kristina R Fulton
*Assistant Examiner* — Faria F Ahmad

(57) ABSTRACT

A latch described herein comprises a ratchet movable between a primary closed position, a secondary closed position and an open position. The ratchet is biased towards the open position for facilitating travel of a striker in a fishmouth of the latch to the secondary closed position. The latch includes a pawl movable between a primary locking position, a secondary locking position and an unlocking position. The pawl is biased towards the primary locking position and has a pawl locking surface for holding the ratchet in the primary closed position and the secondary closed position. The latch includes a lift lever biased towards the open position for moving the striker in the fishmouth away from the secondary closed position and towards the open position when the pawl is in the unlocking position. The striker is further from the primary position when in the open position compared to the secondary closed position.

10 Claims, 20 Drawing Sheets

(52) U.S. Cl.
CPC ........... *E05B 83/243* (2013.01); *E05B 83/247* (2013.01); *Y10S 292/14* (2013.01); *Y10S 292/23* (2013.01); *Y10T 292/1047* (2015.04); *Y10T 292/1082* (2015.04); *Y10T 292/1092* (2015.04)

(58) Field of Classification Search
CPC ......... Y10T 292/1047; Y10T 292/1082; Y10S 292/23; Y10S 292/14
USPC .......... 292/210, 216, 201, DIG. 23, DIG. 14, 292/220
See application file for complete search history.

(56) References Cited

U.S. PATENT DOCUMENTS

| | | | | |
|---|---|---|---|---|
| 5,738,393 A * | 4/1998 | Chao | ................. | E05B 83/24 292/216 |
| 5,853,060 A * | 12/1998 | Chao | ................. | E05B 83/16 180/69.2 |
| 6,106,033 A * | 8/2000 | Ruckert | ................. | E05B 83/16 292/216 |
| 6,109,670 A * | 8/2000 | Tomaszewski | ......... | E05B 83/24 292/216 |
| 6,149,210 A * | 11/2000 | Hunt | ................. | E05B 83/16 292/216 |
| 6,213,235 B1 * | 4/2001 | Elhardt | ................. | B62D 25/10 180/69.2 |
| 6,422,616 B1 * | 7/2002 | Wortmann | ............. | E05B 83/24 292/214 |
| 6,485,071 B2 * | 11/2002 | Schwaiger | ................. | E05B 83/16 292/216 |
| 6,581,987 B1 * | 6/2003 | Gentile | ................. | E05B 83/24 292/216 |
| 6,666,483 B2 * | 12/2003 | Baniak | ................. | E05B 83/24 292/123 |
| 6,695,360 B1 * | 2/2004 | Forsell | ................. | E05B 83/16 292/201 |
| 8,573,658 B2 * | 11/2013 | Kim | ................. | B60R 21/34 292/201 |
| 9,145,716 B2 * | 9/2015 | Jayasuriya | ............. | E05B 77/08 |
| 9,534,428 B2 * | 1/2017 | Kim | ................. | E05B 83/24 |
| 10,035,490 B2 * | 7/2018 | Kim | ................. | E05C 1/08 |
| 2012/0074715 A1 * | 3/2012 | Kim | ................. | B60R 21/34 292/201 |
| 2013/0300134 A1 * | 11/2013 | Jayasuriya | ............. | E05B 77/08 292/129 |
| 2014/0159386 A1 * | 6/2014 | Faruque | ................. | E05B 77/08 292/196 |
| 2014/0246870 A1 | 8/2014 | Kim et al. | | |
| 2015/0076833 A1 * | 3/2015 | Rosales | ................. | E05B 85/26 292/92 |
| 2015/0102607 A1 * | 4/2015 | Kim | ................. | B62D 25/12 292/92 |
| 2015/0115625 A1 * | 4/2015 | Park | ................. | E05B 83/24 292/194 |
| 2015/0145263 A1 * | 5/2015 | Farris | ................. | E05B 83/24 292/195 |
| 2016/0076279 A1 * | 3/2016 | Ilea | ................. | E05B 83/24 292/220 |

FOREIGN PATENT DOCUMENTS

| | | |
|---|---|---|
| DE | 102009037037 A1 | 2/2011 |
| DE | 102010062700 A1 | 6/2012 |
| GB | 907930 | 10/1962 |
| WO | 2013127002 A1 | 9/2013 |

* cited by examiner

LATCH WITH DOUBLE PULL FOR CLOSURE PANEL

FIELD

The present disclosure relates to latches for closure panels and more particularly to vehicle hood latches.

BACKGROUND

Latches for vehicle hoods and the like are typically actuated in two stages. During a first stage a handle is actuated inside the vehicle which moves the latch from a primary closed position to secondary closed position. To release the latch completely the vehicle occupant typically must exit the vehicle and actuate a lever that is under the hood. This may be inconvenient in some situations.

The current state of the art for hood latch involves two operations to open gain access to the hood, one operation from inside the vehicle followed by an additional hood actuation at the front of the vehicle to complete the release of the latch. Desired is a mechanism to provide for a multiple stage release from inside of the vehicle. Also desired is visual signal that the hood has been released by the multiple stages. Further, having a compatible active pedestrian protection latch with the multiple stage release could also be desirable.

In terms of lifting a hood in general and specifically for an active pedestrian protection system, the latch is needed to provide a travel that is greater than that which is used for normal opening. Due to mechanical limitations of springs and targets for mass and packaging, the normal opening lift of the hood cannot be as high as compared to what is provided using the active pedestrian protection system.

The automotive industry is attempting to better protect pedestrians from head on collisions with vehicles. When a car hits a pedestrian in a front collision, the pedestrian can be thrown up and land on the front hood of the vehicle and/or the windshield. In an effort to ameliorate the harshness of the impact, and in particular to prevent the person's head from hitting the engine block or other hard point located directly underneath the front hood, it is desired to actively space the front hood from the engine block whenever a front end collision is detected.

SUMMARY

In an aspect, a latch for cooperating with a striker comprising: a ratchet movable between a primary closed position, a secondary closed position and an open position, wherein the ratchet is biased towards the open position for facilitating travel of the striker in a fishmouth of the latch to the secondary closed position; a pawl movable between a primary locking position, a secondary locking position and an unlocking position, wherein the pawl is biased towards the primary locking position, in the primary closed position the pawl has a pawl locking surface for engaging a primary locking surface on the ratchet and holding the ratchet in the primary closed position and in the secondary closed position the pawl has the pawl locking surface for engaging a secondary locking surface on the ratchet holding the ratchet in the secondary closed position; a lift lever biased towards the open position and having a lift surface for moving the striker in the fishmouth away from the secondary closed position and towards the open position when the pawl is in the unlocking position; wherein the striker is further from the primary position when in the open position than when the striker is in the secondary closed position.

A further aspect as latch for cooperating with a striker comprising: a ratchet movable between a primary closed position, a secondary closed position and an actuated position, wherein the ratchet is biased towards the actuated position for facilitating travel of the striker in a fishmouth of the latch to the secondary closed position; a pawl movable between a primary locking position and a secondary locking position, wherein the pawl is biased towards the primary locking position, in the primary closed position the pawl has a pawl locking surface for engaging a primary locking surface on the ratchet and holding the ratchet in the primary closed position and in the secondary closed position the pawl has the pawl locking surface for engaging a secondary locking surface on the ratchet holding the ratchet in the secondary closed position; a lift lever biased towards the actuated position and having a lift surface for moving the striker in the fishmouth away from the secondary position and towards the actuated position when the pawl is in the secondary closed position; wherein the striker is further from the primary position when in the actuated position than when the striker is in the secondary closed position.

BRIEF DESCRIPTION OF THE DRAWINGS

The foregoing and other aspects will now be described by way of example only with reference to the attached drawings, in which.

DETAILED DESCRIPTION

Figure 1:
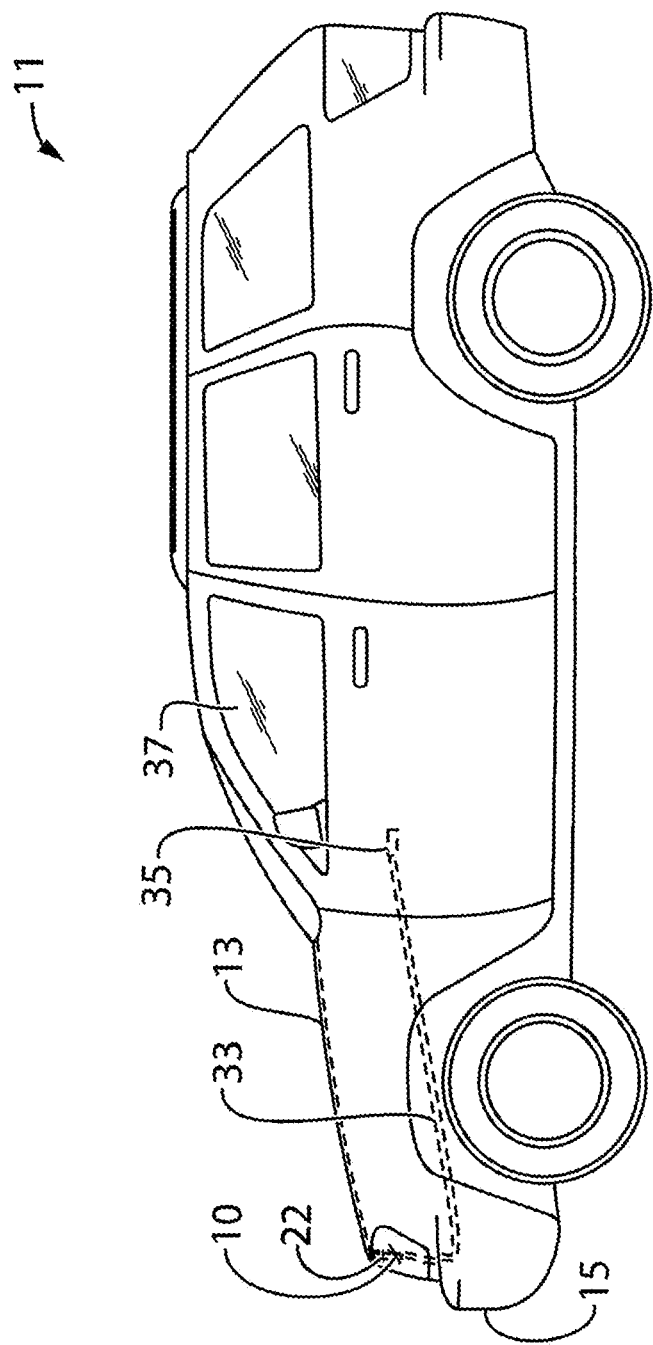
FIG. 1 is a side view of a vehicle.
Figure 2:
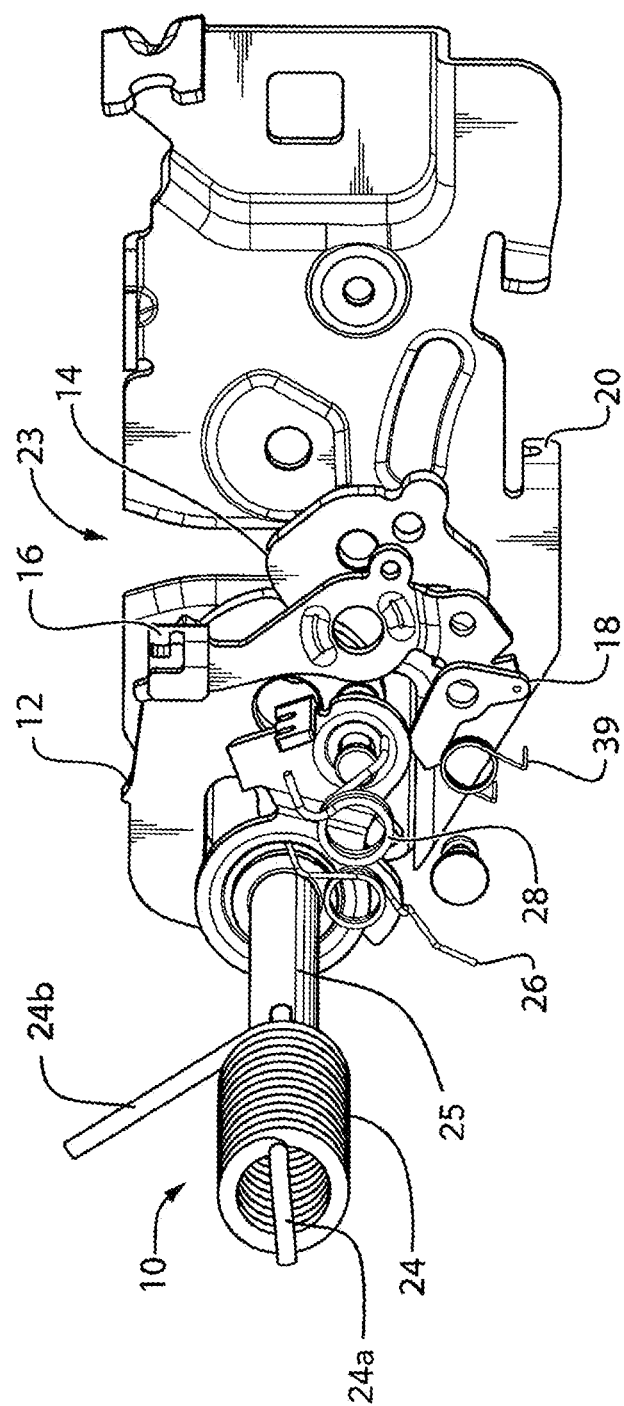
FIG. 2 is a perspective view of a latch in the vehicle shown in FIG. 1.
Figure 3:
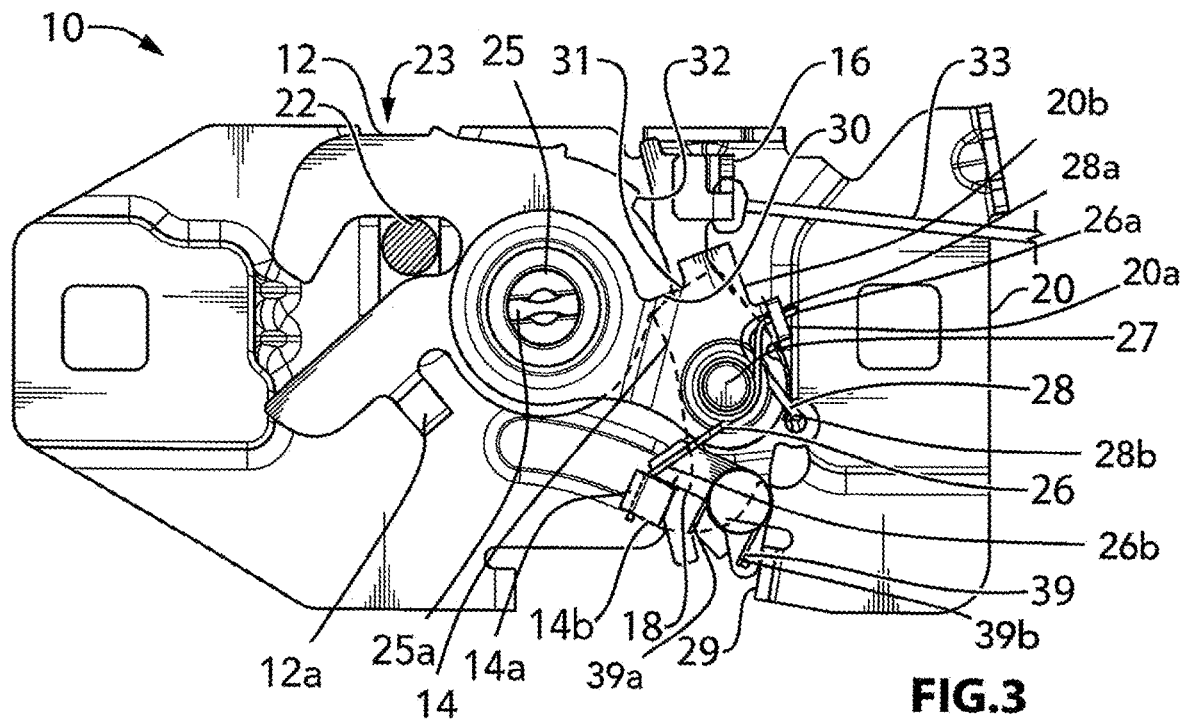
FIG. 3 is a plan view of the latch shown in FIG. 2, in a primary closed position.

Reference is made to FIG. 1, which shows a vehicle 11 that has a hood 13, on which there is a striker 22. The striker 22 is capturable by a latch 10 that is mounted on the body (shown at 15) of the vehicle 11. Referring to FIG. 2, the latch 10 includes a ratchet 12, a pawl 14, a release lever 16, a double pull lever 18, and a housing 20 (part of which is omitted for clarity). The view shown in FIG. 2 is an exploded view, and accordingly, the elements of the latch are not shown in their installed positions in FIG. 2. As shown in FIG. 3, the ratchet 12 is pivotably connected to the housing 20 and is movable between a primary closed position shown in FIG. 3, a secondary closed position shown in FIG. 6, and an open position shown in FIG. 9. The pivotal movement of the ratchet 12 may take place about a pin 25 (FIG. 3) that is mounted to the housing 20. In the primary and secondary closed positions, the ratchet 12 inhibits the withdrawal of a striker 22 from a fishmouth 23, such that the striker 22 is mounted on the vehicle hood 13 or other closure panel from the latch 10. When in the primary closed position, the ratchet 12 holds the striker 22 relatively deeper into the fishmouth (shown at 23) of the housing 20 than in the secondary closed position. Thus, in the primary closed position the ratchet 12 holds the striker 22 at a first depth in a fishmouth 23 of the housing 20, and in the secondary closed position the ratchet 12 holds the striker 22 at a second depth in a fishmouth 23 of the housing 20.

In one example, a body of the ratchet 12 can have a hook portion 8 (see FIG. 6) for inhibiting release of the striker 22 from the fishmouth 23 when the pawl 14 and ratchet 12 are in the secondary position, which occurs as a result of operated release mechanism 17 (see FIG. 2) misaligning the pawl 14 from engagement with a primary locking surface 30 on the ratchet 12 and aligning for subsequent engagement of the pawl 14 with the secondary locking surface 32 on the ratchet 12. Alternatively, the hook portion 8 can be separate from the body of the ratchet 12 and connected to (or otherwise part of) a body of the vehicle 11, the hood 13, and/or the housing 20 of the latch 10. Secondary position of the ratchet 12 is defined as the position of the striker 22 in the fishmouth 23 that is distanced away from the primary or locked position while at the same time having the striker 22 being restricted by the hook portion 8 from leaving the fishmouth 23 (i.e. placing the latch 1 in an open state).

The ratchet 12 is biased towards the open position by a ratchet biasing member 24 (FIG. 2). The ratchet biasing member 24 may be, for example, a torsion spring. The torsion spring may extend around the pin 25 and may have a first end 24*a* (FIG. 2) anchored in a slot 25*a* (FIG. 3) in the pin 25 and a second end 24*b* that acts against an engagement member 12*a* on the ratchet 12.

Figure 9:
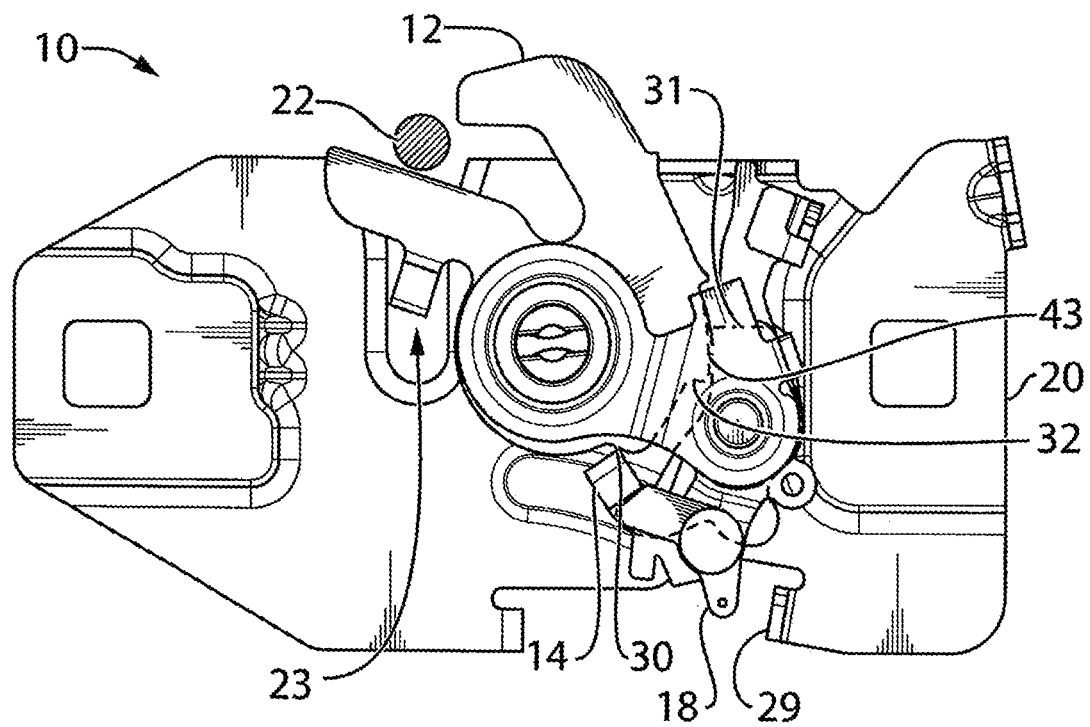
FIG. 9 is a plan view of the latch shown in FIG. 2, showing movement of the ratchet to an open position.

The pawl 14 is pivotably connected to the housing 20 and is movable between a primary locking position (FIG. 3), a secondary locking position (FIG. 6) and an unlocking position (FIG. 9). The pivotal movement of the pawl 14 may be about a pin 27 (FIG. 3), which defines an axis A (shown in FIG. 4), which may be referred to as a pawl axis. In the primary locking position (FIG. 3) a pawl locking surface 31 on the pawl 14 engages a primary locking surface 30 on the ratchet 12 and holds the ratchet 12 in the primary closed position. In the secondary locking position (FIG. 6), the pawl locking surface 31 can engage a secondary locking surface 32 on the ratchet 12 to hold the ratchet 12 in the secondary closed position. In the unlocking position (FIG. 9) the pawl 14 provides for the ratchet 12 to move to the open position as unhindered by the pawl 14. The pawl 14 is biased towards the primary locking position by a pawl biasing member 26 (FIG. 2). The pawl biasing member 26 may be, for example, a torsion spring. The torsion spring may extend around the pin 27 and have a first end 26*a* anchored through an aperture in an ear 20*a* on a plate 20*b* that is part of the housing 20, and a second end 26*b* that engages an engagement tab 14*a*. The engagement tab 14*a* extends inwardly from a release arm 14*b* that extends outwardly from the general plane of the pawl 14 so as to be engageable by the operated release mechanism 17 (e.g. the release lever 16 and the double pull lever 18) having one or more levers to engage the pawl 14 and to provide for movement of the ratchet 12 from the primary/home position (see FIG. 3) to the secondary position (see FIG. 6) and from the secondary position to the open/unlocked position (see FIG. 9), as explained in further detail below.

Figure 4:
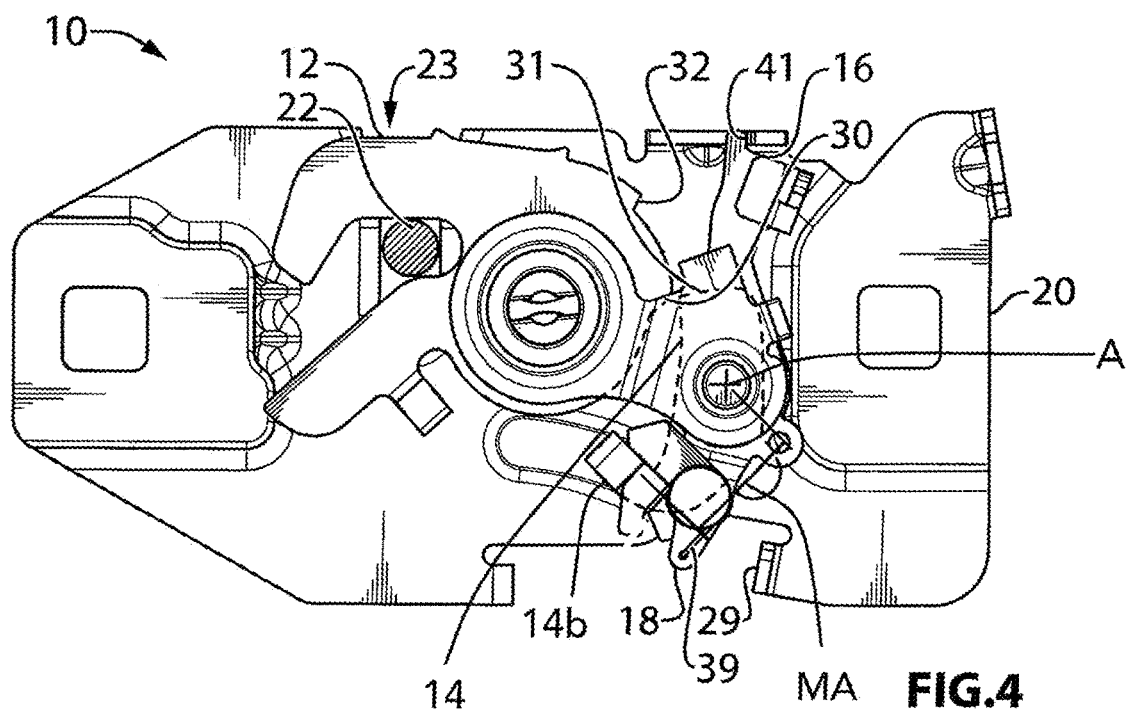
FIG. 4 is a plan view of the latch shown in FIG. 2, showing actuation of a release lever.

As one example of the operated release mechanism 17, the release lever 16 is pivotably connected to the housing 20 and is movable between a home position shown in FIG. 3, and an actuated position shown in FIG. 4. The pivotal movement of the release lever 16 may be about the same pin 27 (FIG. 3) and axis A (FIG. 4) about which the pawl 14 pivots. Thus the axis A may be referred to as a release lever axis A. Actuation of the release lever 16 (i.e. movement of the release lever 16 from the home position to the actuated position) drives movement of the pawl 14 from the primary locking position to the secondary locking position or from the secondary locking position to the unlocked position, as described further below. The release lever 16 can be biased towards the home position by a further component of the operated release mechanism 17 being a release lever biasing member shown at 28. The release lever biasing member 28 may be, for example a torsion spring. The torsion spring may extend around the pin 27 and have a first end 28*a* anchored through an aperture in the ear 20*a* on the plate 20*b* from the housing 20, and a second end 28*b* that extends through an aperture in the release lever 16. A cable 33 (FIGS. 1 and 3) may connect the release lever 16 to a further component of the operated release mechanism 17 being an actuation handle 35 (FIG. 1) or the like in the passenger compartment (shown at 37) of the vehicle. Actuation of the handle 35 brings the release lever 16 to the actuated position.

Figure 7:
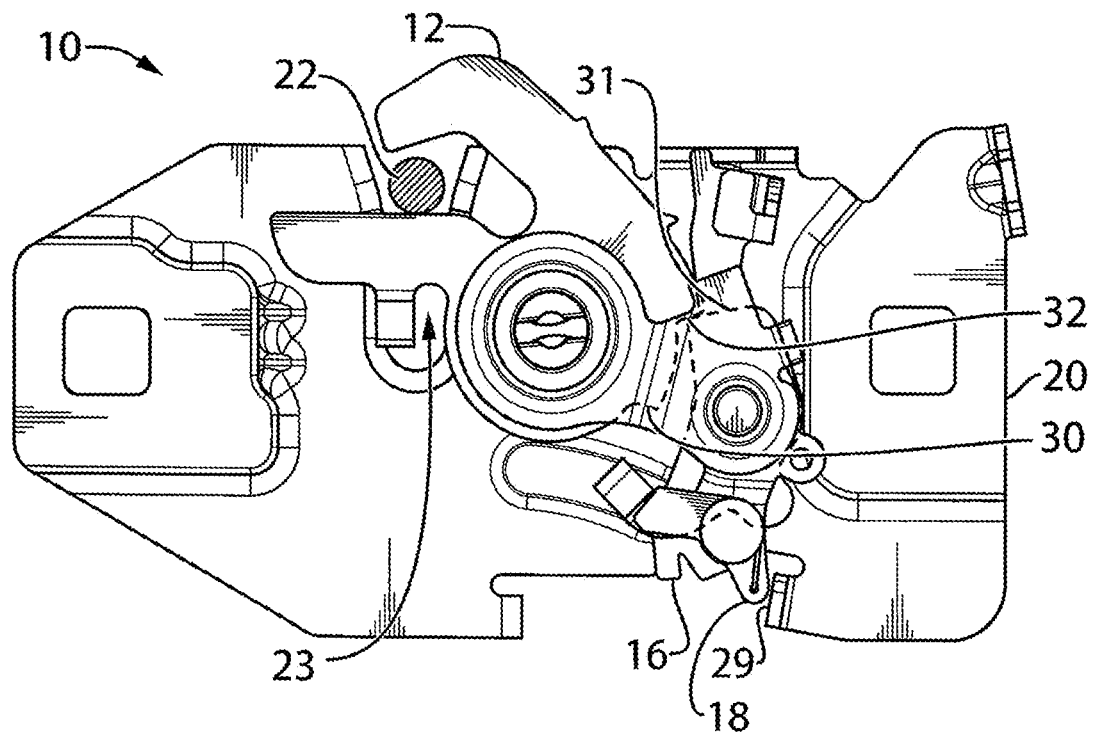
FIG. 7 is a plan view of the latch shown in FIG. 2, showing an initial amount of travel of the release lever during a second actuation of the release lever.

A further component of the operated release mechanism 17 can be the double pull lever 18 that is pivotably connected to the release lever 16 and is movable between an inoperative position shown in FIG. 3, and an operative position shown in FIG. 7. In the inoperative position, the double pull lever 18 does not drive movement of the pawl 14 when the release lever 16 is actuated. In the operative position, the double pull lever 18 does drive movement of the pawl 14 when the release lever 16 is actuated, as described further below. The double pull lever 18 is biased towards the operative position by a further component of the operated release mechanism 17 being a double pull lever biasing member 39 (FIGS. 2 and 3). The double pull lever biasing member 39 may be, for example, a torsion spring. The torsion spring may extend around the pin 27 and have a first end 39a anchored in a notch 16a in the release lever 16, and a second end 39b that extends through an aperture in the double pull lever 18.

When the latch 10 is positioned in a primary closed position, as shown in FIG. 3), the double pull lever 18 is prevented from leaving the inoperative position by two features. One feature is a double pull lever engagement surface 29 on the housing 20 which engages the double pull lever 18 and holds the double pull lever 18 in the inoperative position when the release lever 16 is in the home position. It will be noted that the double pull engagement surface 29 may also serve to act as a stop surface for defining the home position for the release lever 16. Alternatively another surface elsewhere on the housing 20 may be used to limit the travel of the release lever 16 under the urging of the release lever biasing member 28. The second feature that prevents the double pull lever 18 from leaving the inoperative position is the release arm 14b on the pawl 14 itself. When the pawl 14 is in the primary locking position the release arm 14b on the pawl 14 inhibits the double pull lever 18 from rotating into position to get between the pawl 14 and the release lever 16 so as to be able to transfer a force from the release lever 16 to the pawl 14.

In one embodiment, the operation of the latch 10 and coupled operated release mechanism 17 is as follows. The latch 10 is shown in the primary closed position in FIG. 3. In this position, the pawl 14 engages the primary locking surface 30 on the ratchet 12 and holds the ratchet 12 in the primary closed position. A vehicle occupant inside the passenger compartment 37 (FIG. 1) actuates (e.g. manually) the operated release mechanism 17 a first time by pulling the handle 35, which drives the release lever 16 clockwise (in the view shown in FIG. 3) to the actuated position shown in FIG. 4. In the position shown in FIG. 3, the double pull lever 18 is in the inoperative position. However, because the pawl 14 is in the primary locking position, the pawl 14 can be reached by and engaged by the release lever 16 directly when the release lever 16 is actuated. Actuation of the release lever 16 of the operated release mechanism 17 drives the pawl 14 to the secondary locking position shown in FIG. 5. This provides for the ratchet 12 to move from the primary closed position to the secondary closed position as shown in FIG. 6 under the bias of the ratchet biasing member 24.

Figure 5:
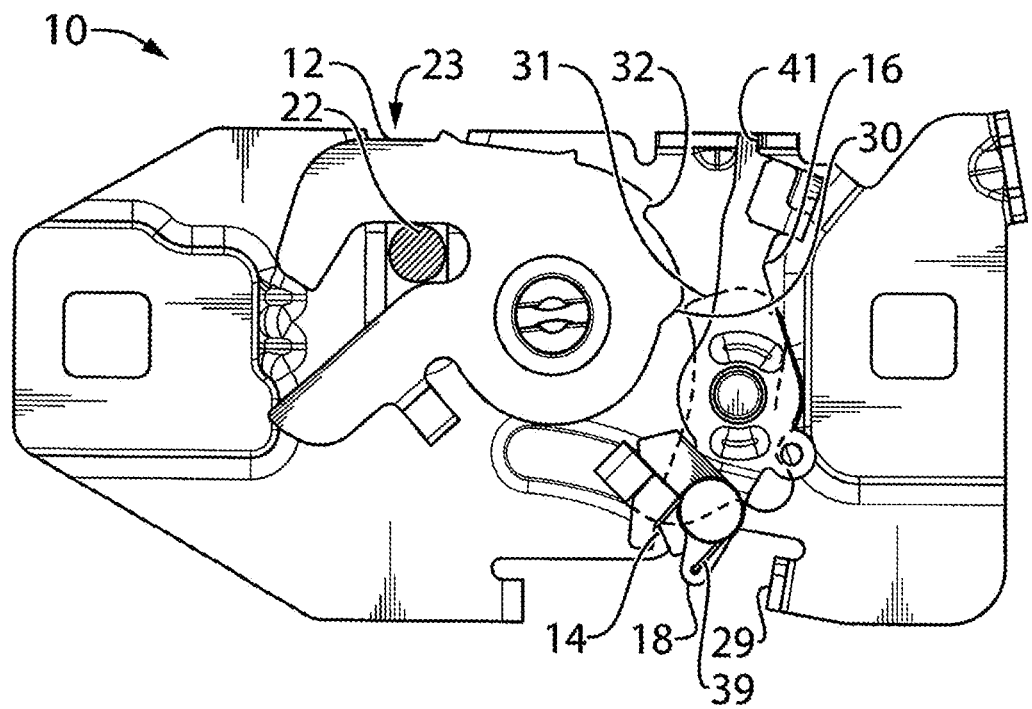
FIG. 5 is a plan view of the latch shown in FIG. 2, showing movement of a ratchet to a secondary closed position.

As can be seen in FIGS. 4 and 5, the actuated position of the operated release mechanism 17 for the release lever 16 can be set by a release lever limit surface 41 on the housing 20. In other words, the release lever limit surface 41 can determine the actuated position for the release lever 16 and inhibit movement of the release lever 16 therepast. As a result, the release lever 16 cannot directly drive the pawl 14 past the secondary locking position on the first actuation of the operated release mechanism 17 (e.g. by manual operation of the handle 35). It is also recognized that rather than use of the handle 35, the first (and/or subsequent) actuation(s) of the of the operated release mechanism 17 can be effected by a button or other user interface mechanism provided to the occupant of the vehicle 11 for operation of the operated release mechanism 17.

Figure 6:
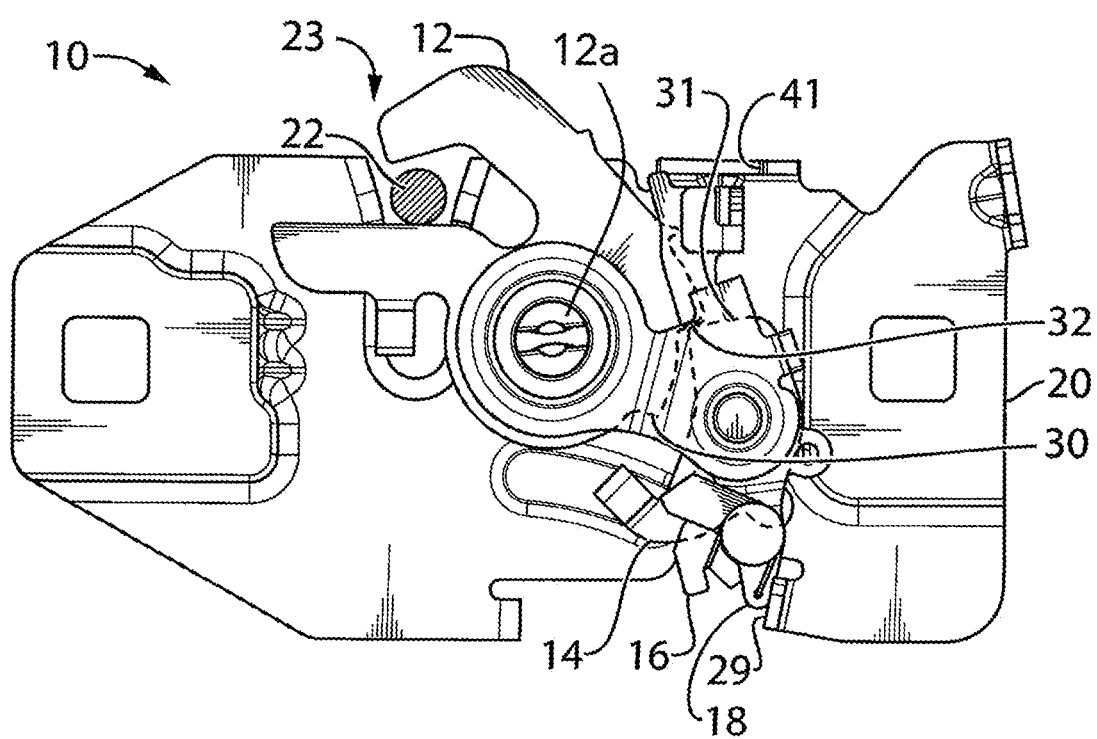
FIG. 6 is a plan view of the latch shown in FIG. 2, showing release of the release lever with the ratchet in the secondary closed position.

After actuating the release lever 16, the vehicle occupant may release the handle 35 permitting the release lever 16 to return to the home position as shown in FIG. 6. The position shown in FIG. 6 is the secondary closed position for the latch 10. In this position, the ratchet 12 is held in the secondary locking position by engagement of the pawl 14 with the secondary locking surface 32 on the ratchet 12. During the movement of the pawl 14 from the primary locking position to the secondary locking position by the operated release mechanism 17, (e.g. from actuation of the release lever 16), the double pull lever 18 of the operated release mechanism 17 is inhibited from moving to the operative position because such movement is obstructed by the release arm 14b on the pawl 14 itself, as described above. It is alternatively possible for such movement of the double pull lever 18 to the operative position to be obstructed by other means, however.

When the release lever 16 is in the home position, the double pull lever 18 is inhibited from leaving the inoperative position by the double pull lever engagement surface 29, regardless of the position of the pawl 14. More specifically, as the release lever 16 rotates (counterclockwise in the view shown) to the home position, the release lever 16 brings the double pull lever 18 into engagement with the surface 29. The force with which the release lever 16 is driven counterclockwise by the release lever biasing member 28 overcomes any resistive force from the double pull lever biasing member 39 thereby resulting in a rotation of the double pull lever 18 clockwise to the inoperative position against the bias of the biasing member 39.

Figure 8:
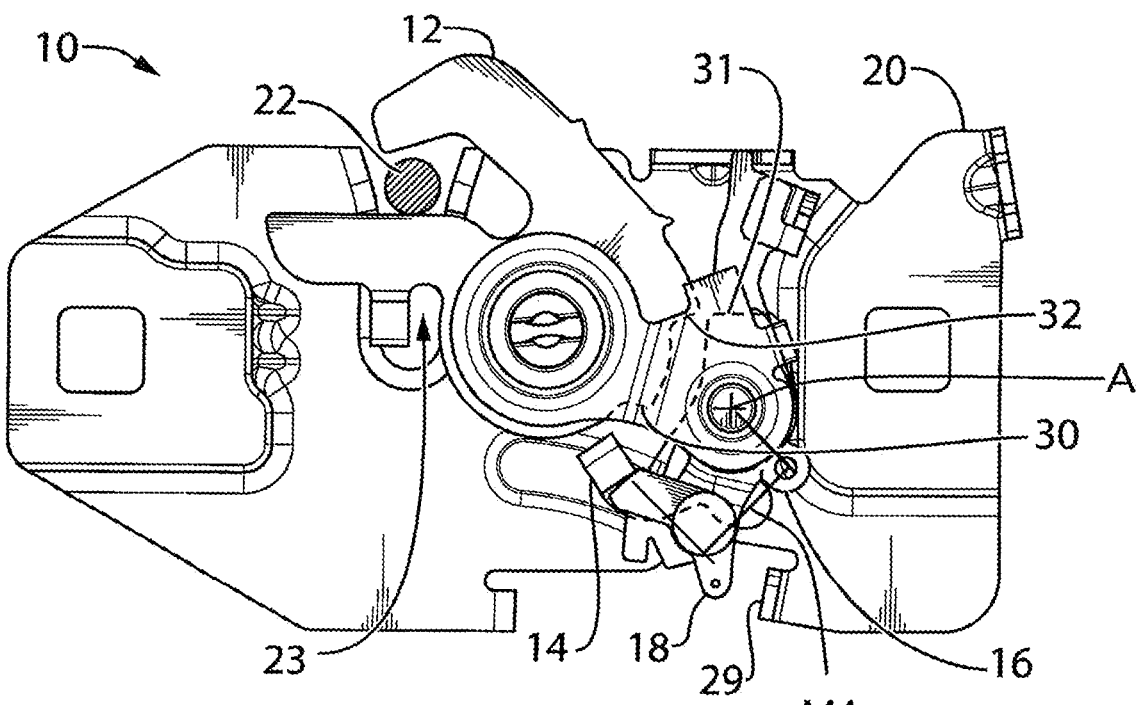
FIG. 8 is a plan view of the latch shown in FIG. 2, showing completion of the second actuation of the release lever.

To bring the latch to the fully open position so as to fully release the striker 22 from the latch 10, the vehicle occupant may actuate the operated release mechanism 17 (e.g. The release lever 16) using the handle 35. It will be noted that the pawl 14, which is in the secondary locking position in FIG. 6, no longer obstructs movement of the double pull lever 18 to the operative position. Accordingly, once the double pull lever 18 disengages from the double pull lever engagement surface 29 (as shown in FIG. 7) during movement of the release lever 16 from the home position shown in FIG. 6 to the actuated position shown from FIG. 8, the double pull lever 18 moves (counterclockwise in the view shown in FIGS. 6 and 7) to the operative position under the bias of the biasing member 39. In the operative position, the double pull lever 18 extends the effective reach of the release lever 16 so that movement of the release lever 16 to the actuated position (FIG. 8) drives the pawl 14 (via the double pull lever 18) to move from the secondary locking position (FIGS. 6 and 7) to the unlocked position (FIG. 8). Movement of the pawl 14 to the unlocked position permits movement of the ratchet 12 to the open position shown in FIG. 9 under the bias of the ratchet biasing member 24 (FIG. 2), thereby permitting the striker 22 to leave the ratchet 12 and the hood 13 (FIG. 1) to open. In this example manner, the operated release mechanism 17 provides for operation of the ratchet 12 and movement of the striker 22 in the fishmouth 23 from the primary position (see FIG. 3) to the secondary position (see FIG. 6) and then from the secondary position to the open or unlocked position (see FIG. 9) of the latch 10.

Figure 10:
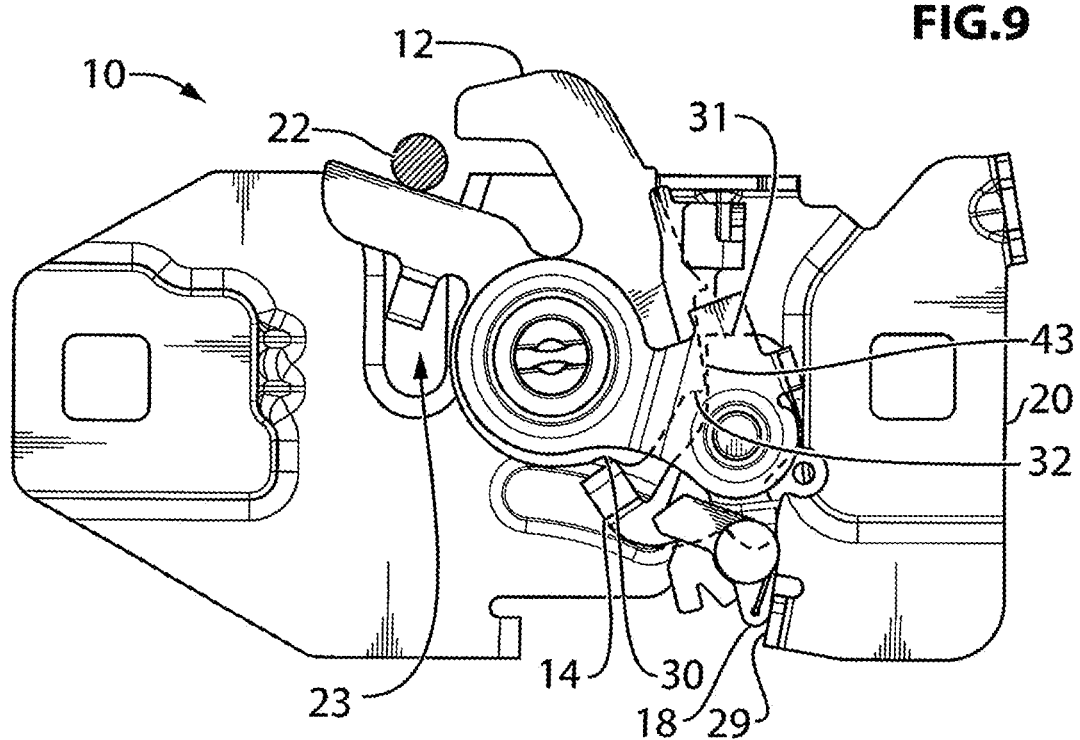
FIG. 10 is a plan view of the latch shown in FIG. 2, showing release of the release lever with the ratchet to an open position.

Upon release of the handle 35, the release lever 16 of the operated release mechanism 17 is permitted to return to the home position as shown in FIG. 10. FIG. 10 corresponds to the open position for the latch 10. As can be seen in FIG. 10, the movement of the release lever 16 back to the home position brings the double pull lever 18 of the operated release mechanism 17 back into engagement with the engagement surface 29, which brings the double pull lever 18 into the inoperative position and out of the path of the pawl 14. Additionally, the pawl 14 is permitted to be biased by the pawl biasing member 26 (FIG. 3) into engagement with a slide surface 43 (FIG. 10) on the ratchet 12.

In the position shown in FIG. 10, the latch 10 is ready to close again upon entry of the striker 22 into the fishmouth 23. When such entry occurs (e.g. When a vehicle occupant or driver closes the hood 13 (FIG. 1), the striker 22 drives the ratchet 12 back to the secondary closed position shown in FIG. 6 and ultimately to the primary closed position shown in FIG. 3. During such movement of the ratchet 12, the pawl 14 can move under the bias of the pawl biasing member 26 (FIG. 2) from the unlocked position shown in FIG. 10 to the secondary locking position shown in FIG. 6 and finally to the primary locking position shown in FIG. 3. Because the double pull lever 18 of the operated release mechanism 17 is held in the inoperative position by the engagement surface 29, the double pull lever 18 permits the return of the pawl 14 to the primary locking position shown in FIG. 3.

It will be noted that, when the latch 10 is in the secondary closed position shown in FIG. 6, the vehicle occupant can decide that they do not want to fully open the hood 13 and can press down on the hood 13 to fully close it. In such an event, the movement of the pawl 14 from the secondary locking position to the primary locking position is permitted by the double pull lever 18 of the operated release mechanism 17 because the double pull lever 18 is kept in the inoperative position by the engagement surface 29.

It has been disclosed for the pawl 14 to inhibit the double pull lever 18 of the operated release mechanism 17 from moving to the operative position during movement of the pawl 14 from the primary locking position to the secondary locking position (and during movement of the ratchet 12 from the primary closed position to the secondary closed position). It is alternatively possible for the ratchet 12 itself to inhibit the double pull lever 18 from moving to the operative position during movement of the pawl 14 during movement of the ratchet 12 from the primary closed position to the secondary closed position. For example, the ratchet 12 could be provided with an arm that is engageable with double pull lever 18 to obstruct the movement of the double pull lever 18 to the operative position. The arm would engage and obstruct the double pull lever 18 during travel of the ratchet 12 to the secondary closed position, at which point the arm would leave the double pull lever 18 to permit the double pull lever 18 to drop in behind the release arm 14b on the pawl 14 under the urging of the biasing member 39.

Use of the latch 10 can reduce the need for the occupant to pull a lever or handle (or press a button or other user interface element) inside the vehicle 11 and then exit the vehicle 11 to go to the hood 13 or other closure panel, and release the hood 13 or other closure panel by manually finding and actuating a second lever with their hands, which can dirty the occupant's hands and which can be otherwise inconvenient.

Furthermore, this latch 10 inhibits a situation where an occupant inadvertently completely opens the hood 13 after actuating the handle 35 only a single time, as facilitated by the primary and secondary positions and the respective corresponding locking surfaces 30,32 of the ratchet 12 when engaged by the pawl 14, as aligned or misaligned by the operated release mechanism to effect the engagement or disengagement respectively.

While element 18 of the operated release mechanism 17 has been described as a double pull lever, the element 18 may also be referred to as an extension member and may be described in one aspect as working as follows. When the pawl 14 is in the primary locking position (FIG. 3) the operated release mechanism 17 (e.g. having the release lever 16) has a selected amount of reach for driving the pawl 14 from the primary locking position (FIG. 3) to the secondary locking position (FIG. 6) during movement of the release lever 16 from the home position to the actuated position. When the pawl 14 is in the secondary locking position (FIG. 6) the operated release mechanism 17 (e.g. having the extension member 18) is movable to a position to extend the reach of the operated release mechanism 17 (e.g. of the release lever 16) to drive the pawl 14 from the secondary locking position (FIG. 6) to the unlocked position (FIG. 9) during movement of the operated release mechanism 17 (e.g. via the release lever 16) from the home position to the actuated position. In referring to element 18 as an extension member, the biasing member 39 may be referred to as an extension member biasing member 39.

It will be noted that the release lever 16 travels the same angular distance when releasing the pawl 14 from the primary locking position to the secondary locking position, and is travelled when releasing the pawl 14 from the secondary locking position to the unlocked position. It will be further noted that the moment arm (shown at MA in FIG. 4) about the release lever axis A is approximately the same when the release lever 16 is directly engaged with the release arm 14b on the pawl 14 to move the pawl 14 from the primary locking position to the secondary locking position as when the release lever 16 is engaged with the release arm 14b through the double pull lever 18 to move the pawl 14 from the secondary locking position to the unlocked position. Each of these two features contributes to providing the vehicle occupant with a similar feel to the latch 10 when pulling the handle 35 the first time (to move the latch 10 to the secondary closed position) as when pulling the handle 35 the second time (to move the latch 10 to the open position). By providing a consistent feel to the latch 10 the user experience of the vehicle occupant is improved relative to a latch where the feel of the latch 10 is very different between the first and second pulls of the handle 35.

Figure 11:
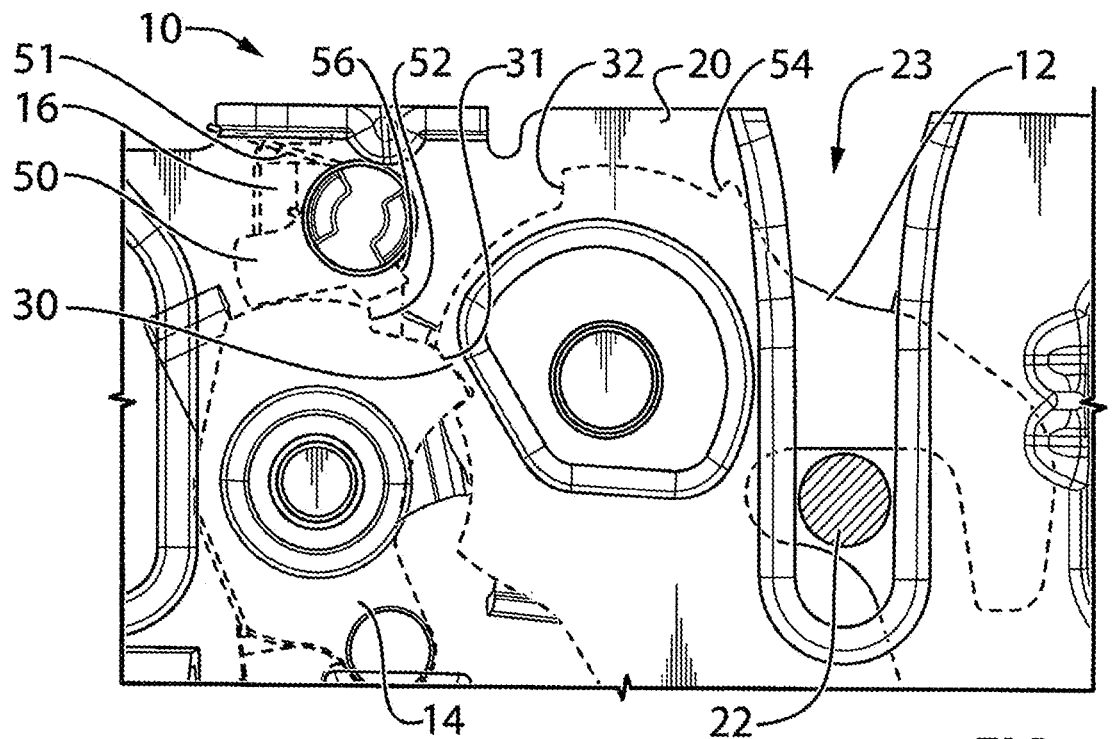
FIG. 11 is a plan view of the latch shown in FIG. 2 and including an optional pawl lockout member, in a primary closed position.

Reference is made to FIG. 11, which shows the latch 10 with an optional pawl lockout lever 50 of the operated release mechanism 17 that is movable between a non-lockout position (FIG. 11) in which the lockout lever 50 does not interfere with the movement of the pawl 14, and a lockout position (FIG. 14) in which the lockout lever 50 interferes with the movement of the pawl 14. The latch 10 further includes a lockout lever biasing member 51 that is positioned to bias the lockout lever 50 towards the lockout position. Some of the components of the latch 10 shown in FIGS. 11-16 may have a different appearance than their counterpart components in FIGS. 2-10, however, the same functions are being performed by those parts and the difference in appearance is not relevant except as noted hereinbelow.

In a situation where there is weight bearing down on the hood 13 (FIG. 1), for example, from a snow load on the hood 13, the force of the ratchet biasing member 24 (FIG. 2) on the ratchet 12 and the force of the hood springs on the hood 13 (and therefore on the striker 22) may be sufficient to drive the ratchet 12 to the secondary closed position, but may be insufficiently strong to drive the ratchet 12 from the secondary closed position to the open position. One reason for this may be that the forces exerted on the ratchet 12 are lower when in the secondary closed position. For example, the spring force from the ratchet biasing member 24 is progressively lower as the biasing member 24 rotates towards its rest position (also referred to as its neutral position). Thus, when the ratchet 12 is in the secondary closed position and the handle 35 is pulled a second time so as to move the pawl 14 to the unlocked position, the ratchet 12 may not move appreciably due to the snow load on the hood 13 (FIG. 1). Thus the ratchet 12 may remain in the secondary closed position. In the event that the ratchet 12 does remain in the secondary closed position, the pawl lockout lever 50 is configured to inhibit the pawl 14 from re-engaging with the secondary locking surface 32 on the ratchet 12 when the vehicle occupant lets go of the handle 35 inside the vehicle 11. As a result, even if the hood 13 did not lift up upon actuation of the handle 35, the occupant could get out of the vehicle 11 and manually lift the hood 13. Without a means for inhibiting the pawl 14 from re-engaging the second locking surface 32 when the occupant releases the handle 35, the pawl 14 may return to the secondary locking position and engage the secondary locking surface 32 on the ratchet 12 if the ratchet 12 has not left the secondary locking position.

When the latch 10 is in the primary closed position, as shown in FIG. 11, the pawl locking surface 31 engages the primary locking surface 30 on the ratchet 12, inhibiting opening of the latch 12 (i.e. removal of the striker 22 from the fishmouth 23). As can be seen, the pawl lockout lever 50 can be in the non-lockout position and does not engage a lockout surface 52 on the pawl 14 and thus permits movement of the pawl 14 from and to the primary locking position. When the handle 35 (FIG. 1) of the operated release mechanism 17 in the vehicle 11 is pulled, the pawl 14 is positioned from the primary locking position to the secondary locking position shown in FIG. 12. The ratchet 12 rotates (counterclockwise in the view shown in FIG. 12) until the pawl 14 engages the secondary locking surface 32 on the ratchet 12. It is noted that radius R1 of first locking surface 30 is less than radius R2 of locking surface 32, as measured from axis of rotation 6 of the ratchet 12. The difference in the radii R1, R2 provides for positioning of the pawl locking surface 31 from the first locking surface 30 to the second locking surface 32 under the influence of biasing members 25,26. As once the pawl 14 is removed (i.e. misaligned) from engagement with the first locking surface 30, the pawl locking surface 31 is moved from a distance R1 from the axis 6 to a distance R2 from the axis 6 and thus will slide along the outer surface of the ratchet 12 (as it rotates under influence of the biasing member 25) bringing the second locking surface 32 situated also at radius R2 as aligned and into engagement with the pawl locking surface 31.

Figure 12:
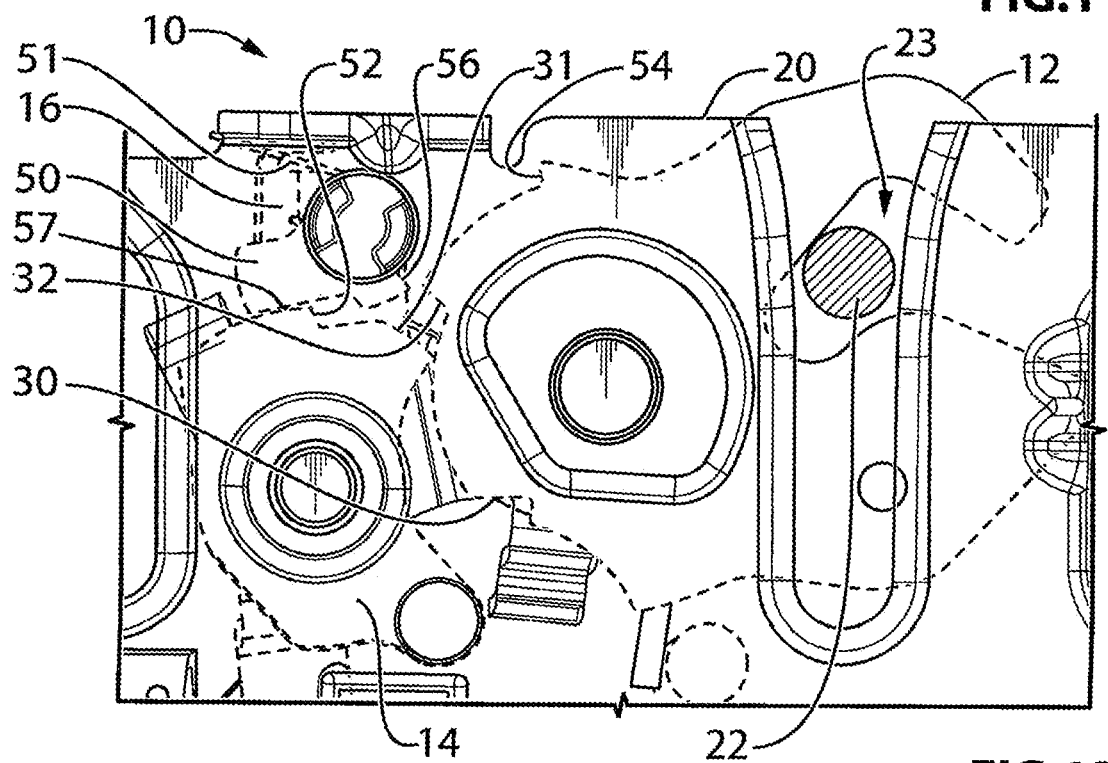
FIG. 12 is a plan view of the latch shown in FIG. 11, showing a pawl in a secondary locking position and movement of the ratchet towards the secondary closed position.

In FIG. 12, the ratchet 12 is shown rotating towards the secondary closed position. When the pawl 14 is in the secondary locking position, the pawl lockout lever 50 remains in the non-lockout position and does not engage the lockout surface 52, and thus still permits movement of the pawl 14 to and from the primary locking position. It will be noted that the pawl 14 itself is preventing the pawl lockout member 50 from leaving the non-lockout position, (by means of a blocking surface 57 on the pawl 14, which obstructs the pawl lockout lever 50 from swinging clockwise in the view shown into position to lock out the pawl 14). However any other suitable member may be used to obstruct the movement of the pawl lockout lever 50.

Figure 13:
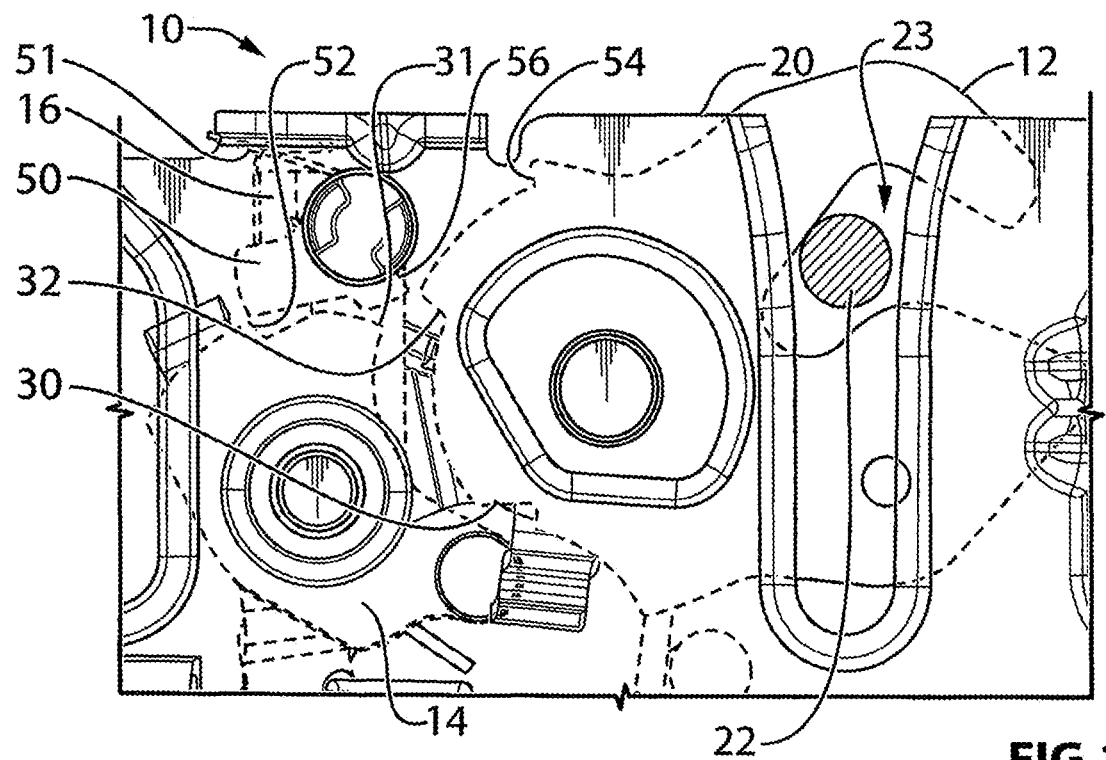
FIG. 13 is a plan view of the latch shown in FIG. 11, showing movement of a pawl towards an unlocked position.
Figure 14:
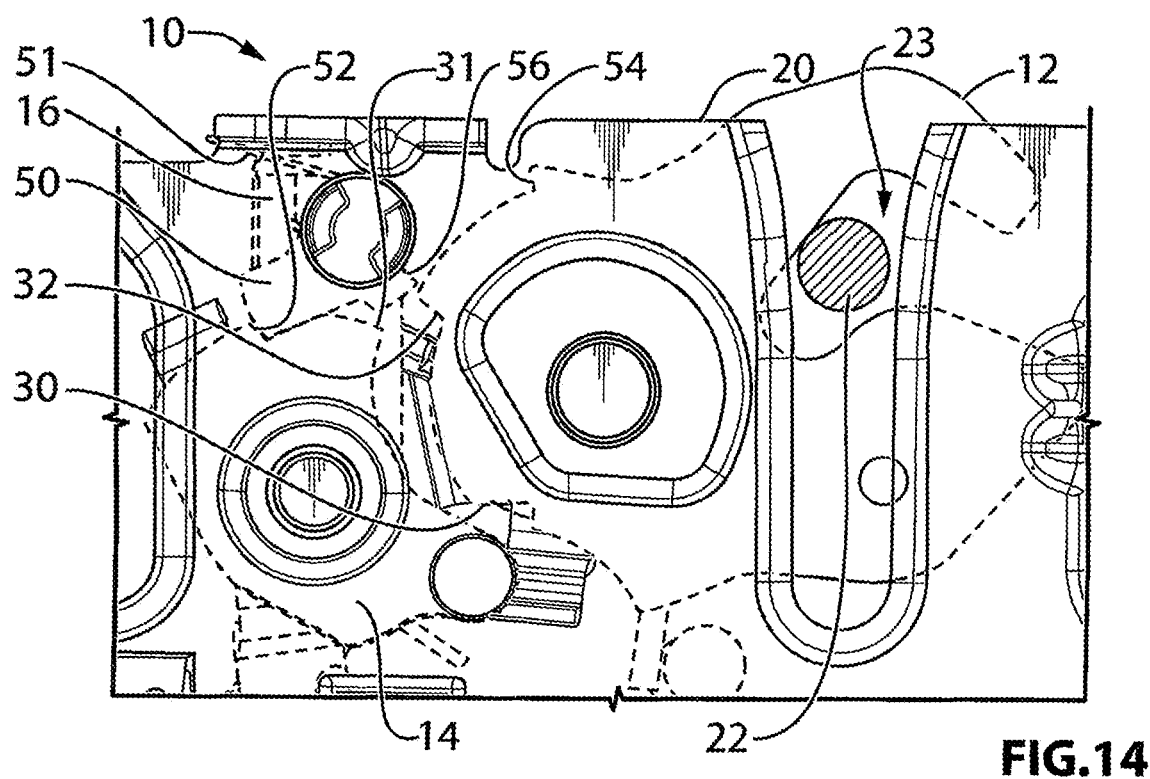
FIG. 14 is a plan view of the latch shown in FIG. 11, showing movement of the pawl lockout member to a lockout position.
Figure 15:
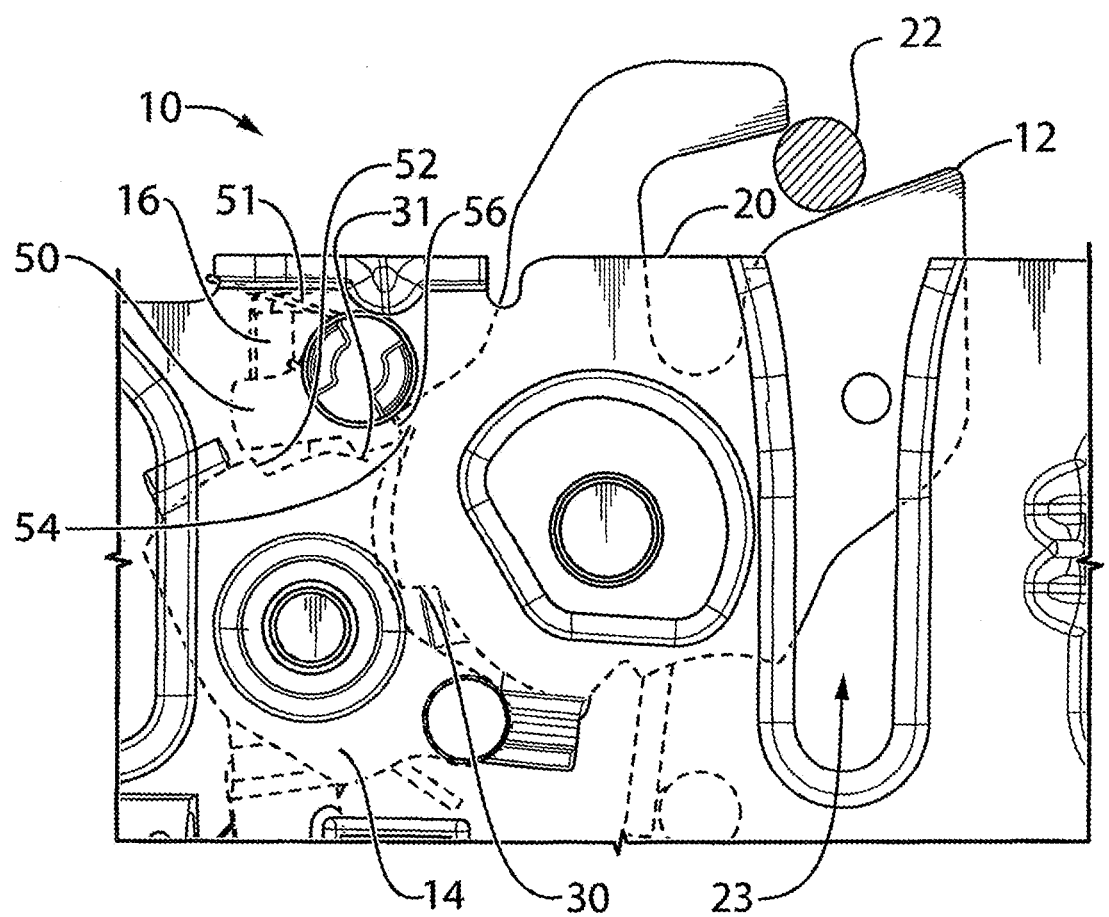
FIG. 15 is a plan view of the latch shown in FIG. 11, showing movement of the ratchet to an open position.
Figure 16:
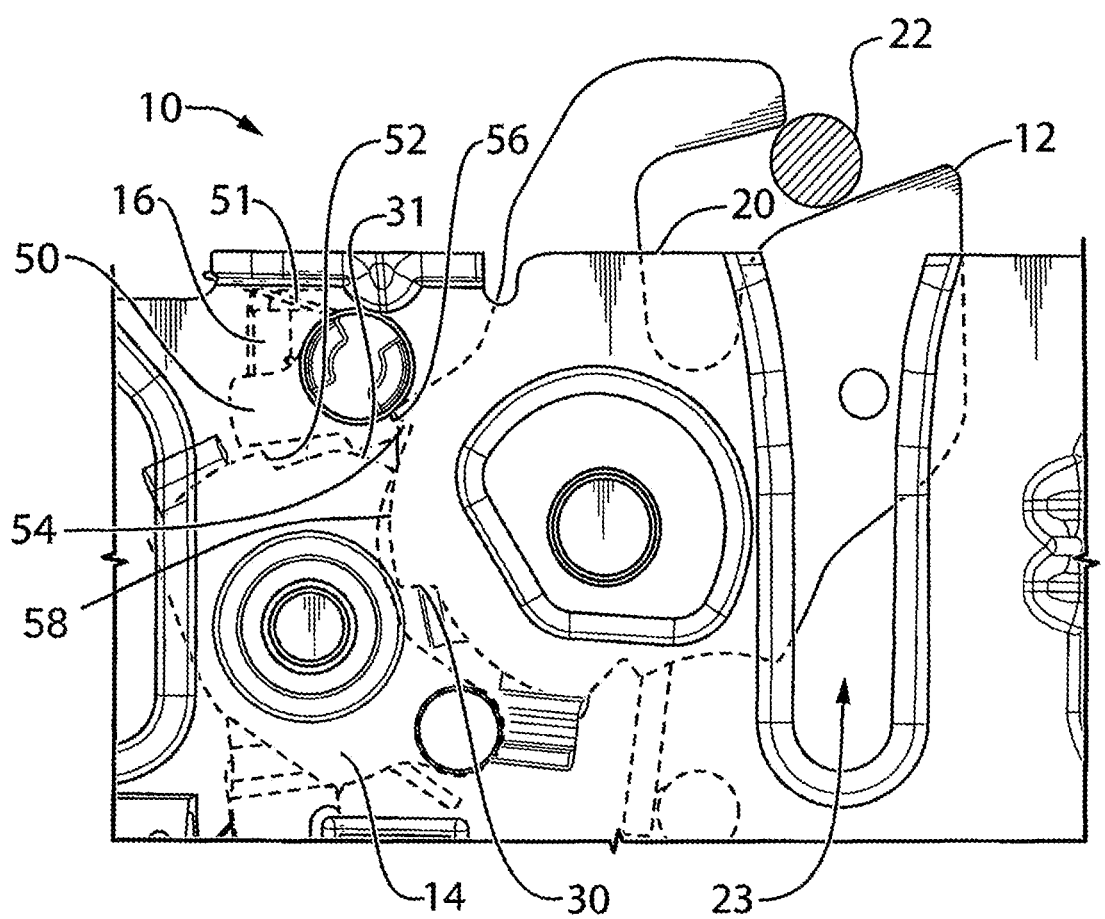
FIG. 16 is a plan view of the latch shown in FIG. 11, showing movement of the pawl to a reset position.

When the handle 35 (FIG. 1) of the operated release mechanism 17 is pulled a second time, the pawl 14 is moved to the unlocking position, shown in FIG. 13. With the pawl 14 in the unlocked position and out of the way, the lockout lever 50 moves into the lockout position (FIG. 14) thereby inhibiting the pawl 14 from leaving the unlocked position and returning to the secondary locking position when the occupant lets go of the handle 35. As a result, the occupant can exit the vehicle 11 if necessary and manually lift the hood 13. Movement of the ratchet 12 to the open position is shown in FIG. 15. The ratchet 12 has a pawl lockout lever disabling surface 54 thereon that is engageable with a receiving surface 56 on the pawl lockout lever 50. When the ratchet 12 moves towards the open position from the secondary closed position, the pawl lockout lever disabling surface 54 engages and drives the pawl lockout lever 50 (clockwise in the view shown in FIG. 15) so that the pawl lockout lever 50 disengages from the lockout surface 52 on the pawl 14, so as to move the pawl lockout member 50 to the non-lockout position, thereby permitting the pawl 14 to move towards the primary locking position. As shown in FIG. 16, the pawl 14, now freed from the pawl lockout member 50 moves to a reset position wherein the pawl 14 rests against a slide surface 58 on the ratchet 12. Once a striker 22 is reintroduced into fishmouth 23 of the housing 20, the striker 22 drives the ratchet 12 to the primary closed position, which permits the pawl 14 to move to the primary locking position to lock the ratchet 12 in the primary closed position, so as to retain the striker 22 (FIG. 11).

The use of a pawl lockout lever has been shown on a particular configuration of a latch 10, however, the pawl lockout lever may be applied to other configurations of a double pull latch for a hood or for other closure panels in a vehicle where there is a risk of a load from snow, ice or from some other source of weight.

Figure 17:
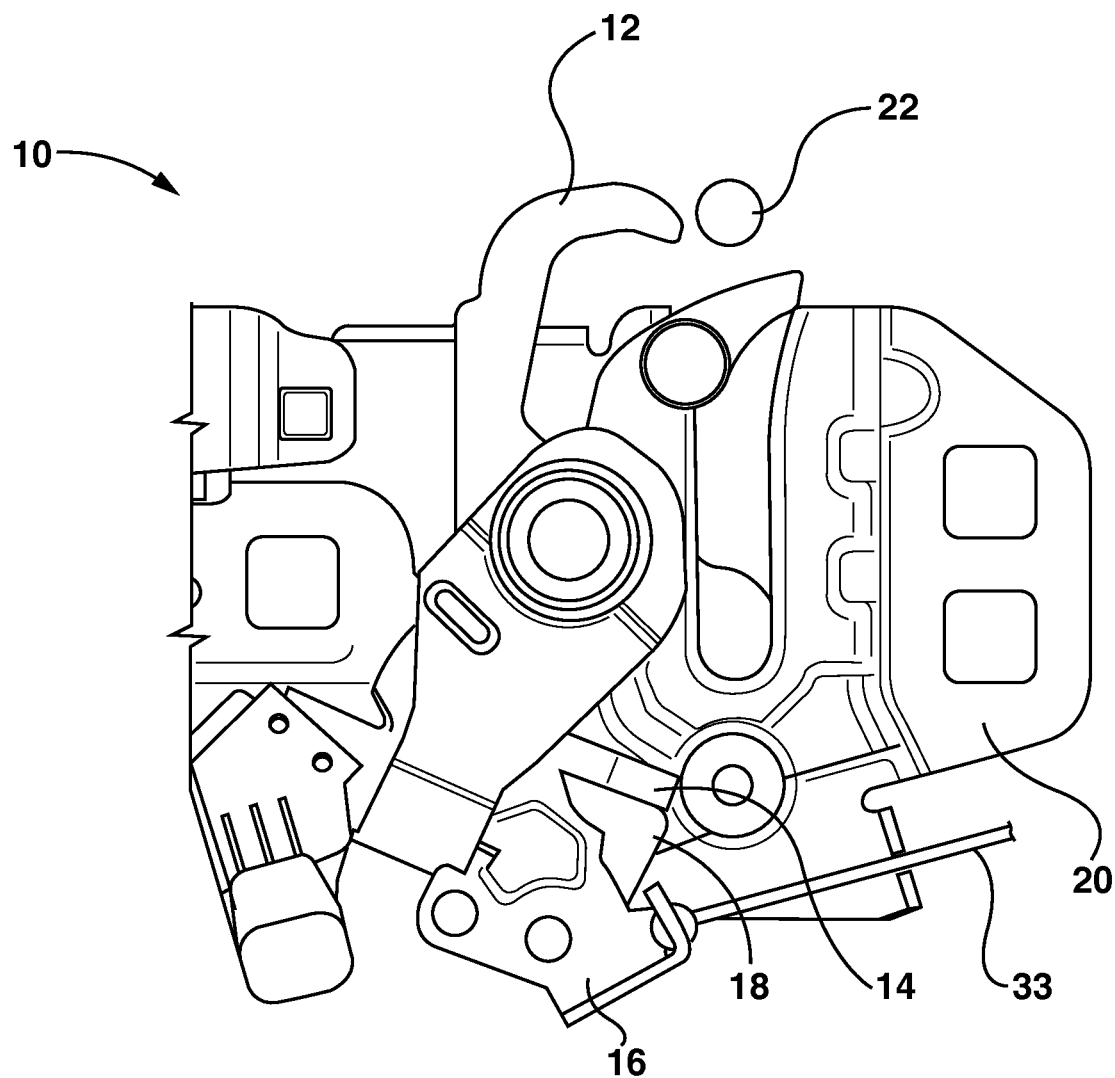
FIG. 17 is a plan view of an alternative configuration for the latch shown in FIG. 1.

As can be seen, in the embodiment shown in FIG. 3, the cable 33 that connects the release lever 16 to the actuation handle 35 (FIG. 1) acts on the release lever 16 at an opposite end of the release lever 16 to an end at which the double pull lever 18 is positioned. Reference is made to FIG. 17, which illustrates an embodiment in which the cable 33 is connected the same end of the release lever 16 that the double pull lever 18 is mounted to. While some components in the embodiment shown in FIG. 17 may have a slightly different shape or configuration as compared to the analogous components in the embodiment shown in FIG. 3, the functions performed may be essentially the same and may be performed in essentially the same way.

Figure 18:
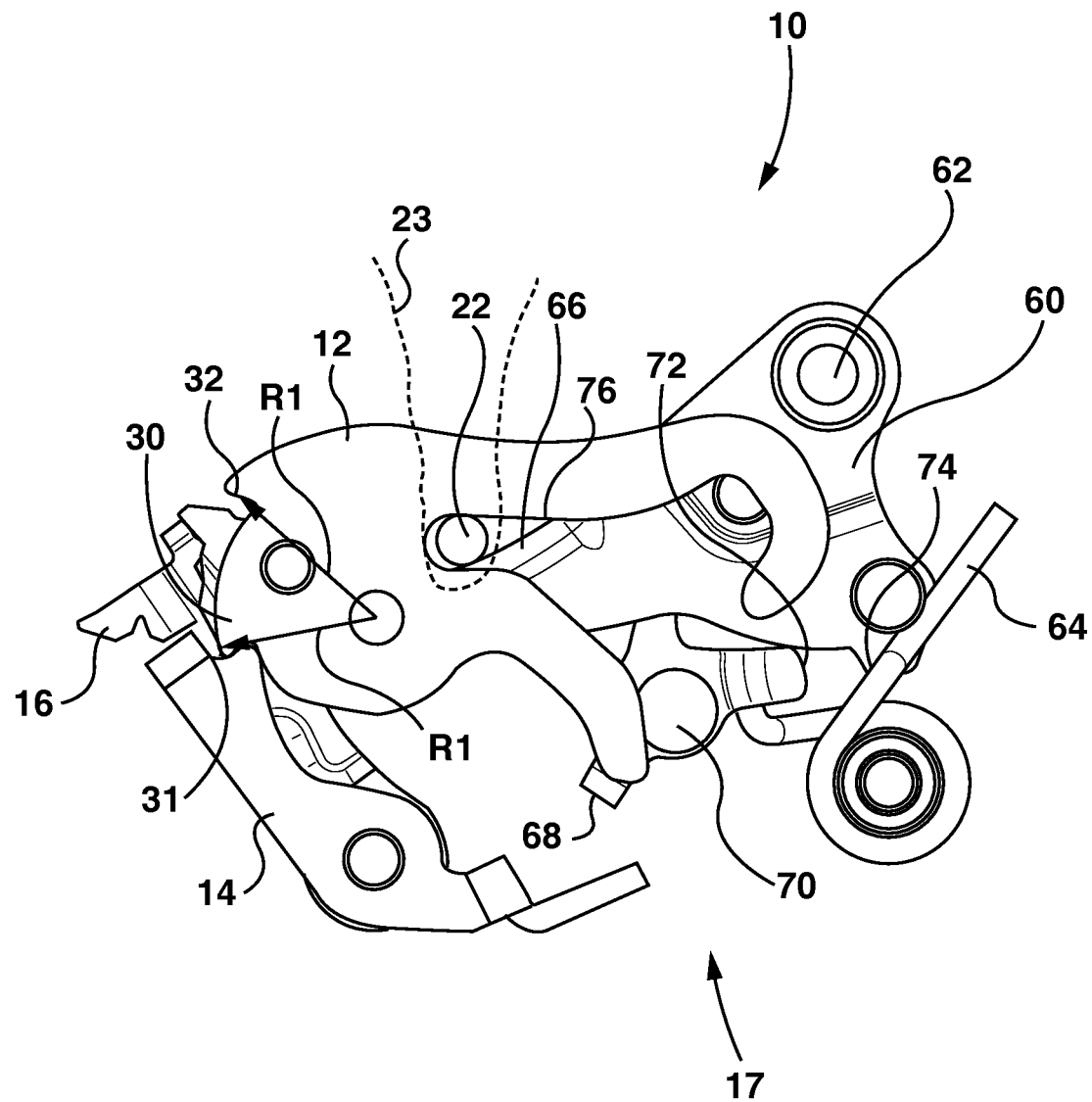
FIG. 18 is a plan view of an alternative embodiment of the latch and release system of FIG. 4 in a closed position.

Referring to FIG. 18, shown is an alternative embodiment of the operated release mechanism 17 coupled to the pawl 14 and ratchet 12 of the latch 10. The operated release mechanism 17 has levers 16,18 for disengaging the pawl 14 from the primary locking surface 30 under first actuation of the operated release mechanism 17 (e.g. via manual operation of the handle 35—see FIG. 1) and from the secondary locking surface 30 under second actuation of the operated release mechanism 17 (e.g. via manual operation of the handle 35—see FIG. 1). As discussed above, positioning of the pawl 14 from aligned engagement with the primary locking surface 30 to aligned engagement with the secondary locking surface 30 is facilitated through rotation of the ratchet 12 by the biasing member 25, once the pawl locking surface 31 is removed (i.e. misaligned) from engagement with the primary locking surface 30 (see FIG. 6). The operated release mechanism 17 also has a lift lever 60 positioned for rotation about pin 62 under the influence of lift biasing member 64 (e.g. torsion spring). Lift biasing member 64 biases lift surface 66 of the lift lever 60 towards the striker 22 and thus the striker 22 itself away from the primary/locked position and towards the opening of the fishmouth 23 (see FIG. 19).

The operated release mechanism 17 also has a lift lock lever 68 rotating about pin 70 and biased into engagement with the lift lever 60 (e.g. by biasing member 64). The lift lock lever 68 had a lock surface 72 for engagement with a corresponding stop 74 of the lift lever 60, as further described below. The lift lever 60 and associated biasing member 64 of the operated release mechanism 17 are configured to raise the striker 22 towards the opening of the fishmouth 23 from the secondary position (resultant of pushing the striker 22 by the ratchet 12 from the primary position to the secondary position once released from engagement, i.e. misaligned, with the pawl 14) to a third position (see FIG. 20). The placement of the striker 22 in the fishmouth 23 in the third position provides for raising of the hood 13 (see FIG. 1) to visually distinguish for the vehicle occupant that ratchet 12 has been released from the secondary position (e.g. The pawl 14 is disengaged or otherwise misaligned from the secondary locking surface 32) and thus the hood 13 is free to be opened as the latch is now in the open position. For the current embodiment, the open position can be defined as where the striker 22 is unrestrained from exit from the fishmouth 23 by the hook portion 8.

FIG. 18 shows (with housing 20 omitted) position of the striker 22 in the primary or locked position of the latch 10. In this position, the pawl locking surface 31 is aligned in engagement with the primary locking surface 30 and the lock surface 72 is aligned with but out of engagement with the stop 74 of the lift lever 60. Further, the striker 22 is sandwiched between lift surface 66 and ratchet surface 76 of the ratchet 12. It is recognized that presence of the striker 22, as restrained by the ratchet 12 position, also loads the lift lever 60 against the bias of the biasing member 64 and thereby provides for the disengagement (or separation) between stop 74 and lock surface 72 while in alignment. As such, in the primary or closed position the lift lever 60 is unlocked (stop 74 and lock surface 72 are disengaged) and therefore it is the position of the ratchet 12 (as locked by the pawl 14 through aligned engagement of the lock surface 31 with the primary locking surface 30) that inhibits travel of the striker 22 up and out of the fishmouth 23 against the bias of the biasing member 25 (see FIG. 2) and biasing member 64.

Figure 19:
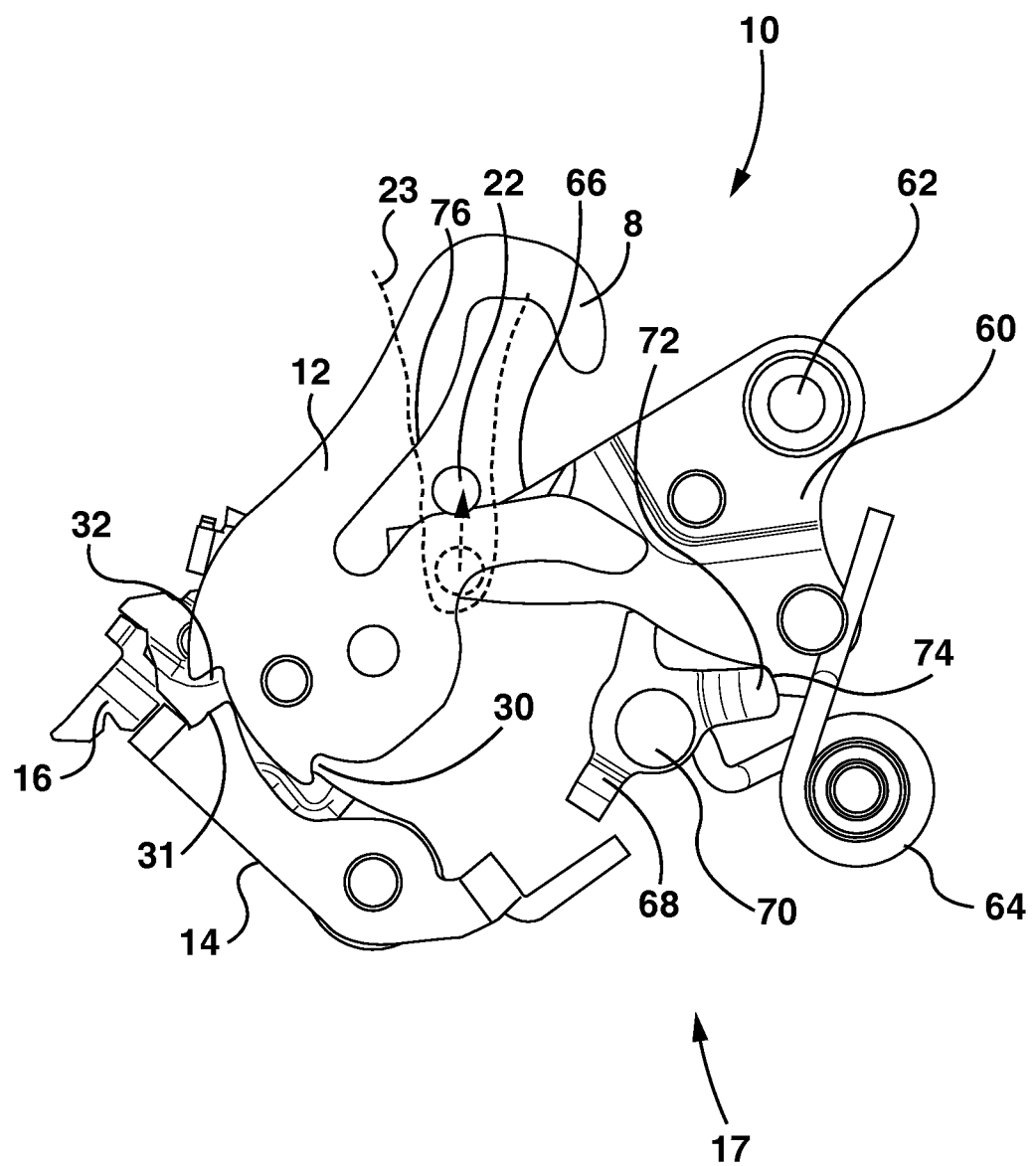
FIG. 19 is a plan view of the latch and release system of FIG. 18 in a secondary closed position.

FIG. 19 shows the results of first actuation of the operated release mechanism 17 of FIG. 18, moving pawl 14 out of engagement with the primary locking surface 30, by moving the locking surface 31 out of alignment with locking surface 30 at radius R1 and into alignment with locking surface 32 at radius R2, and thus into aligned engagement with the secondary locking surface 32. As such, FIG. 19 shows position of the latch 10 in the secondary position, with the original primary position of the striker shown in ghosted view, such that the hook portion 8 remains in position to hinder any potential release of the striker 22 out of the fishmouth 23 (similar to the secondary position shown in FIG. 6). Further, when the latch 10 is in the secondary position, the stop 74 and lock surface 72 are engaged with one another and thus further travel of the lift lever 60 is limited thereby. In this embodiment of the operated release mechanism 17, travel of the striker 22 in the fishmouth 23 is positioned at the secondary position due to locking of the ratchet 12 by engagement of the pawl with the secondary locking surface 32 and engagement of the lift lock lever 68 with the lift lever 60 (e.g. engagement of stop 74 with lock surface 72).

As such, in the secondary position the operated release mechanism 17 locks both the lift lever 60 by lift lock lever 68 and the ratchet 12 by the pawl 14 to inhibit further travel of the striker 22 up and out of the fishmouth 23. Therefore, as shown, after the first release (from the primary position) by the operated release mechanism 17, the ratchet 12 rotation stops at the secondary position (or prior to the secondary position depending on the lift lever 60 stop height influence on position of the striker 22 in the fishmouth 23) and the lift lever 60 rotation is stopped by the lift lock lever 68. After stopping the lift lever 60 in this second position, the pawl 14 is in location to create the secondary position for the ratchet 12 via engagement with the secondary locking surface 32.

Once the operator actuates the operated release mechanism 17 a second time (e.g. pulls the release handle 35), the lever 16,18 engages with the pawl 14 to increase its travel (to disengage from the secondary locking surface 32 by misalignment by positioning the locking surface 31 at a radius greater than radius R2 of the locking surface 32) and allow the ratchet 12 to turn beyond the secondary position under influence of the ratchet biasing member 25. In combination with the release of the pawl 14, the lift lock lever 68 is also displaced (e.g. by travel of the pawl 14 to contact and move the lift lock lever 68 from the lift lever 60 via misalignment of the stop 74 with lock surface 72) so that the lift lever 60 is now free to rotate and drive the striker 22 away from the secondary position and towards the third or open position. This rotation now lifts the hood 13 (coupled to the striker 22) to a higher height providing a visual difference to the occupant between the hood 13 when at the secondary position and the now open position or third position. The original secondary position of the striker is shown in ghosted view in FIG. 20.

Figure 20:
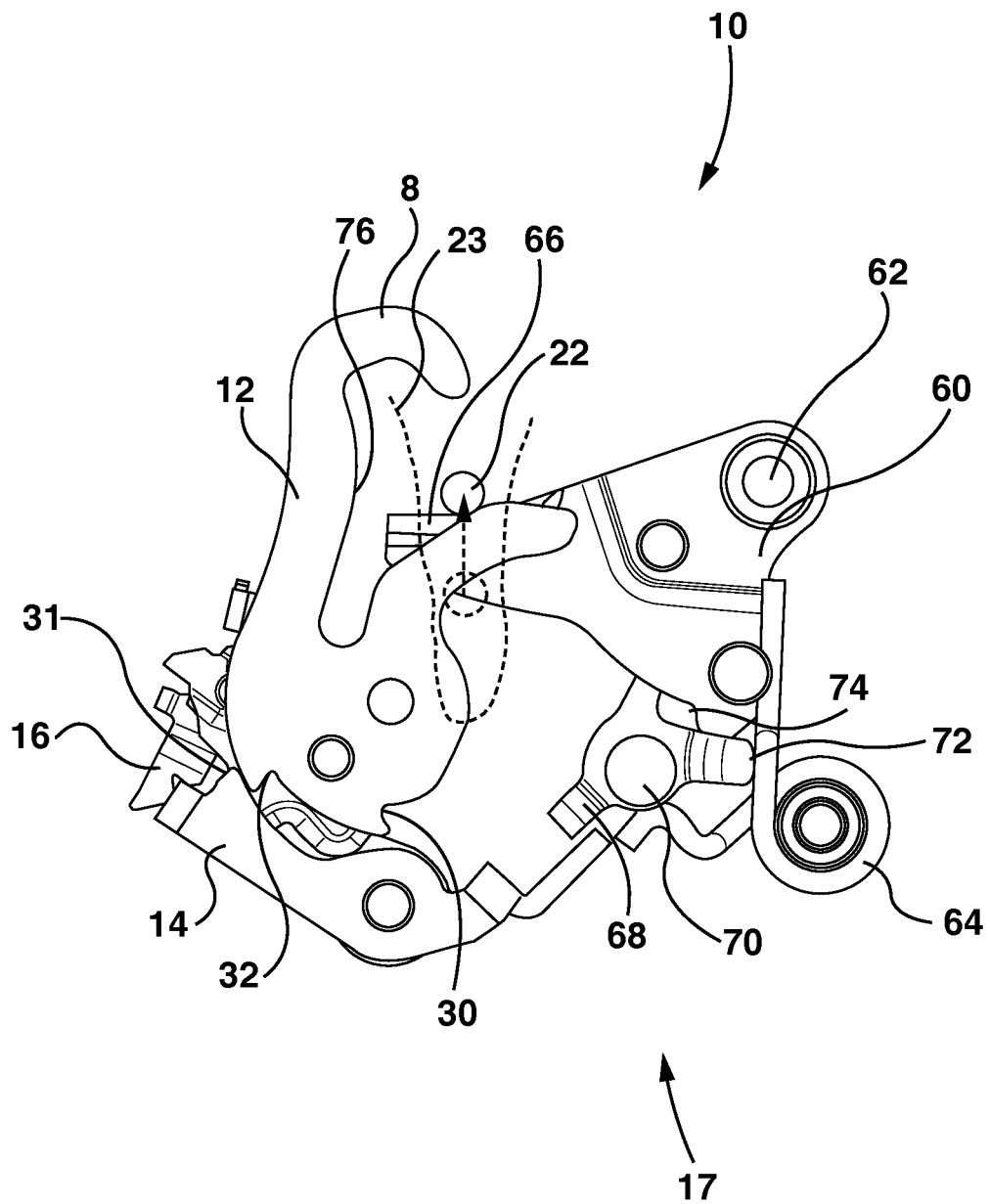
FIG. 20 is a plan view of the latch and release system of FIG. 18 in an open position.

Referring to FIG. 20, placement of the hood 13 in the third position provides a visual signal (i.e. raising of the hood 13 that is connected to the striker 22) to the occupant for a change in locking state of the latch 10 from the closed position to the fully open position via the first and second actuations of the operated release mechanism 17. In the third position, the striker 22 is positioned in the fishmouth 23 such that the hook portion 8 no longer inhibits travel of the striker 22 out of the entrance of the fishmouth 23 and thus provides the open position of the latch 10. As well, in the third position the ratchet 12 rotation is unrestrained from the pawl 14, as the pawl 14 has become misaligned and thus disengaged from the secondary locking surface 32. As well, in the third position the lift lock lever 68 is disengaged from the lift lever 60 so that the lift lever 60 is free to rotate. Now that both the ratchet 12 and the lift lever 60 are free from their respective restraints (i.e. The pawl 14 and the lift lock lever 60 respectively) the hood 13 can be lifted to remove the attached striker 22 from the fishmouth 23 of the latch 10 to allow full access to the engine compartment of the vehicle 11 by the occupant (see FIG. 1).

It is recognized in the above that disengagement of the pawl 14 from the secondary locking surface 32 can also provide for further rotation of the pawl 14 to contact lift lock lever 68 and disengage same from the lift lever 60 (i.e. by causing misalignment between the stop 74 and the lock surface 72, thus allowing the lift lever 60 to rotate and lift the striker 22 into the third position. Alternatively, the operated release mechanism 17 could be configured such that the lever(s) 16,18 actuated by the second pull of the release handle 35, could act on both the pawl 14 (to provide misalignment and thus disengagement from the secondary locking surface 32) and the lift lock lever 68 (to provide misalignment and thus disengagement from the lift lever 60), thus allowing the striker 22 to be lifted into the third position via rotation of the lift lever 60 and/or rotation of the ratchet 12.

Figure 21:
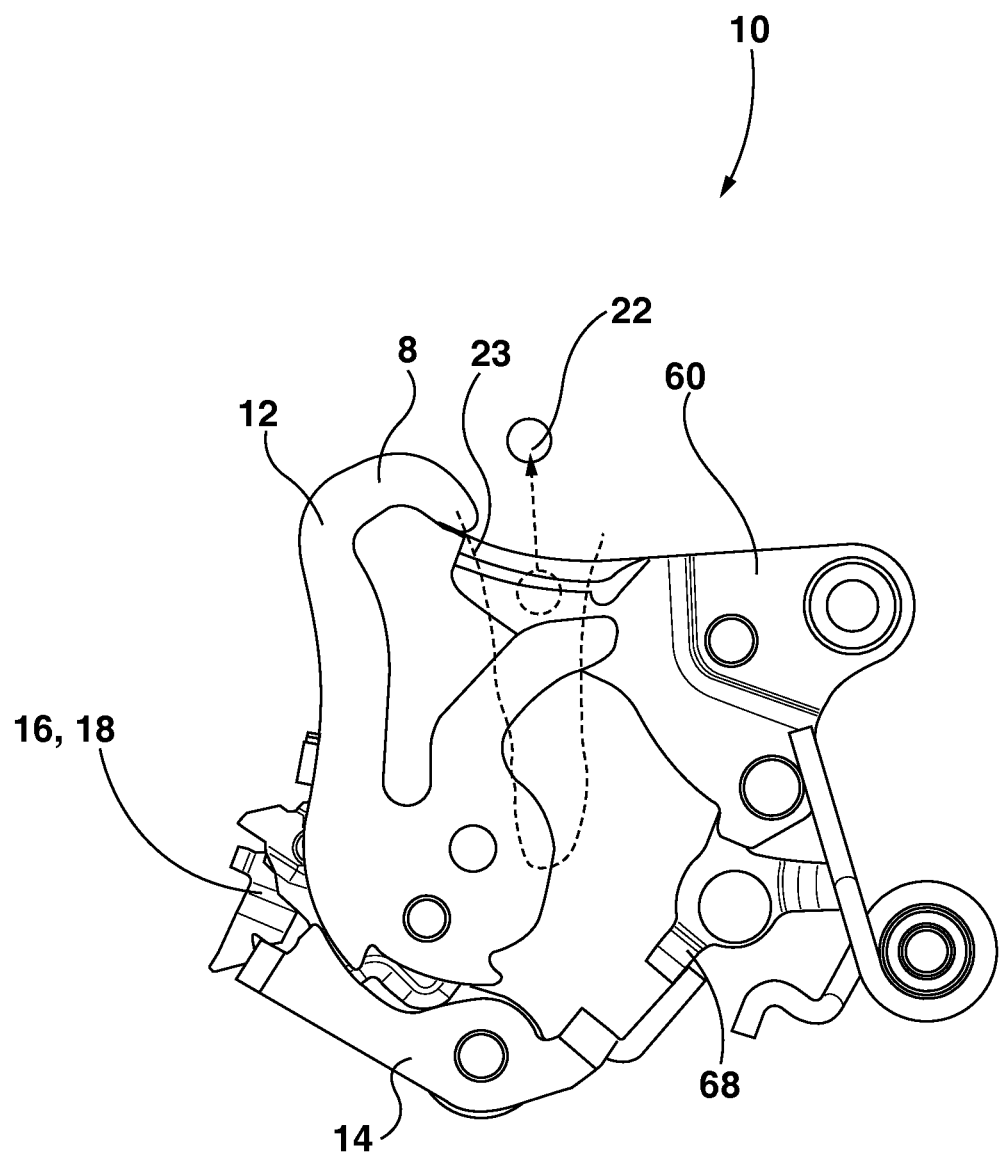
FIG. 21 is a plan view of the latch and release system of FIG. 18 with striker removed from the latch fishmouth.

As noted above, the process of operation of the operated release mechanism 17 to operate the latch 10 from the closed position (see FIG. 18) to the open or third position (see FIG. 20) is as follows:

1) first actuation of the operated release mechanism 17 (e.g. via pull of the release handle 35) to misalign the pawl 14 from engagement with the primary locking surface 30, causing rotation of the ratchet 12 to effect alignment and thus engagement of the pawl 14 with the secondary locking surface 32, and causing rotation of the lift lever 60 to effect engagement of the lift lock lever 68 with the lift lever 60 to move the striker 22 in the fishmouth 23 from the closed position to the second position; and 2) second actuation of the operated release mechanism 17 (e.g. via second pull of the release handle 35) to misalign the pawl 14 from engagement with the secondary locking surface 30 and to misalign engagement of the lift lock lever 68 with the lift lever 60 to move the striker 22 in the fishmouth 23 from the second position to the third or open position under influence of the biasing member(s) 25,64. As noted above, the hook portion 8 when the striker 22 is in the third position no longer restricts the striker 22 from being withdrawn completely out of the fish mouth 23 (see FIGS. 21 and 9 where the original third or open position of the striker is shown in ghosted view in FIG. 21).

Figure 22:
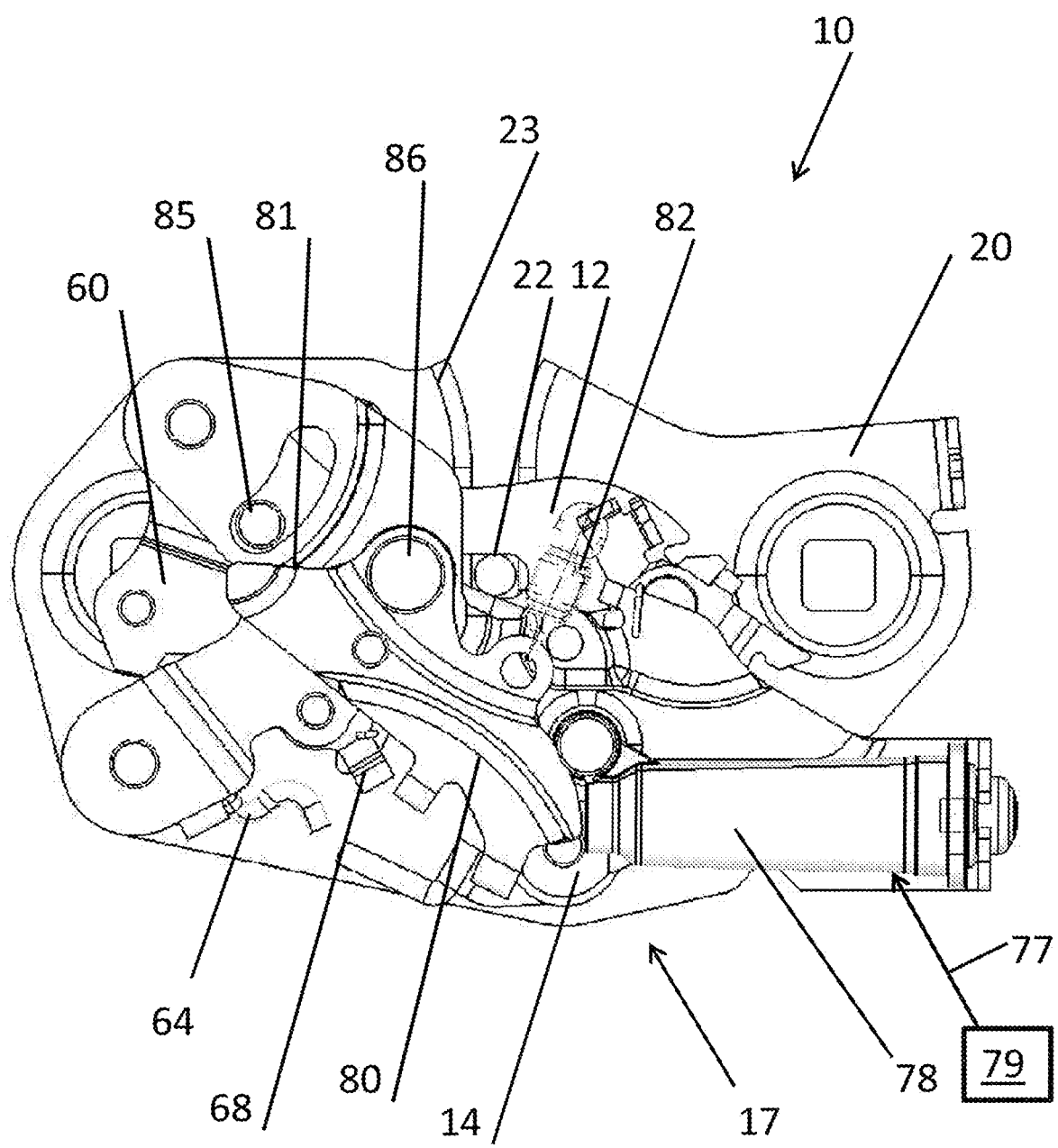
FIG. 22 is a plan view of an alternative embodiment of the latch of FIG. 18 in a closed position.

Referring to FIG. 22, shown is an alternative embodiment of the latch 10, shown initially in the primary or closed position (i.e. The pawl is engaged with the primary locking surface 30 of the ratchet 12 and the striker 22 is restrained in the fishmouth 23 between the ratchet 12 and the lift lever 60 as depicted in FIG. 18). Further, alignment between the stop 74 and the lock surface 72 between the lift lock lever 68 and the lift lever 60 is provided in the primary or closed position to facilitate subsequent engagement there-between when the latch 10 components and operated release mechanism 17 components move from the primary to the secondary position (similar as to shown in FIG. 18). The operated release mechanism 17 can further include an actuator 78 coupled to an actuation mechanism 80 (e.g. one or more members such as levers) that is configured to affect operation of the ratchet 12 and the lift lever 60 (as a result of a sensed crash condition of the vehicle) by controlling positioning of the pawl 14 with respect to the ratchet 12 and the lift lock lever 68 with respect to the lift lever 60. The actuation system 80 is coupled to the housing 20 of the latch 10 (e.g. via pin 86). The actuator 78 is mounted on the housing 20 of the latch 10.

FIG. 22 shows the actuator 78 in an inactivated state, such the actuator 78 is in a rest position and awaiting a signal 77 by a crash system 79 (e.g. having one or more sensors) indicating that a crash condition has been reached (e.g. a pre-impact state due to determined application of vehicle brakes, determined change in speed, triggering of physical impact sensors, determination of vehicle drift, etc.). The actuation mechanism 80 can have a return member (e.g. spring) connected to the housing 20 to bias the actuation mechanism 80 against the actuator 78 and to return the actuation mechanism 80 to the rest position post deployment of the actuator 78. Actuation mechanism 80 has an actuation surface 81 for engaging with portion 85 of the lift lever 60 for assisting the biasing member 64 in moving the lift lever 60 from the primary position to an actuated position (see FIG. 25). The embodiment of the latch 10 and coupled operated release mechanism 17 of FIG. 22 can be part of an active pedestrian protection system.

Figure 23:
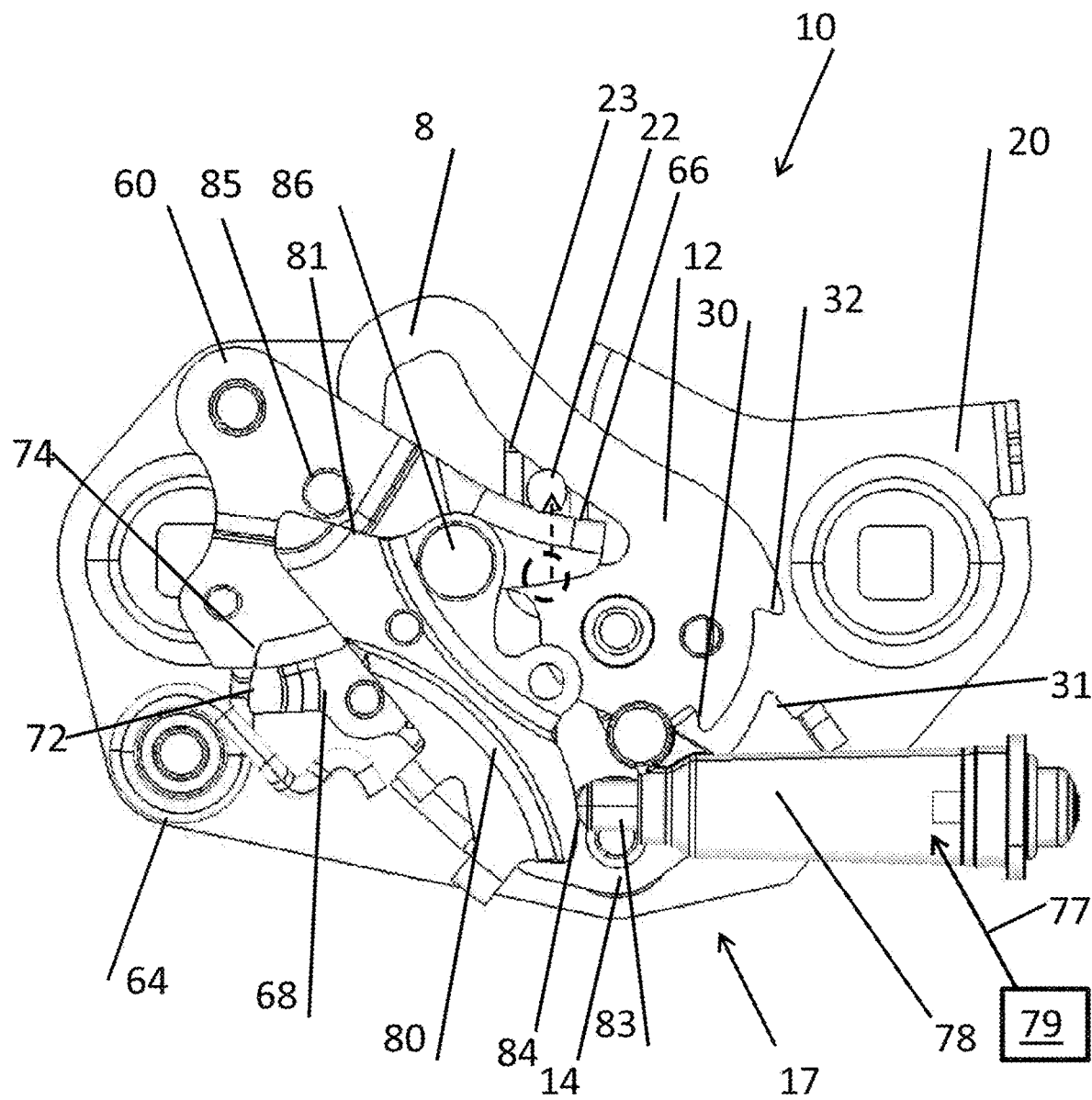
FIG. 23 is a plan view of the latch of FIG. 22 between the closed position and a secondary closed position.

Referring to FIG. 23, the actuator 78 has received the signal 77 from the crash system 79 and activated the actuator 78 by displacing the actuation mechanism 80 from the rest position. For example, the actuator 78 can have an extension member 83 (e.g. push rod) acting against an actuation surface 84 of the actuation system 80 (e.g. actuation lever), which causes the actuation system 80 to displace (e.g. rotate about pin 86) and engage both the lift lock lever 68 to cause misalignment between the stop 74 and the lock surface 72 and engage the pawl 14 to cause misalignment between the lock surface 31 and the primary locking surface 30. The misalignment between the lock surface 31 and the primary locking surface 30 allows the ratchet 12 to move from primary position to the secondary position (see FIG. 24). The misalignment between the stop 74 and the lock surface 72 allows the lift lever 60 to bypass the secondary position and to be actuated by the actuation system 80 and push the striker 22 via lift surface 66 towards the opening of the fishmouth 23. As such the lift lever 60 temporarily travels past through and past the secondary position as it is unrestrained by the lift lock lever 68 when at the secondary position in the travel of the lift lever 60 from the closed position to the actuated position.

It is noted that FIG. 23 shows the ratchet 12 position in transition between the primary position (when locking surfaces 30,31 are engaged) and the secondary position (when locking surfaces 30,32 are engaged), such that the position of the striker 22 in the primary position is shown in ghosted view. The actuation mechanism 80 once actuated can engage actuation surface 81 with portion 85 of the lift lever to assist the biasing member 64 in moving the lift lever 60 away from the primary position and towards the actuated position (see FIG. 25), thus moving the striker 22 via the lift surface 66. Again it is noted that the lift lever 60 remains unrestrained by the lift lock lever 68 when travelling between the primary closed position and the actuated position, as operation of the lift lock lever 68 is influenced by the actuation mechanism 80 (i.e. The lift lock lever 68 is positioned as unaligned (i.e. unaligned surfaces 72,74) with the lift lever 60 when the lift lever 60 is in the region of (before and after) the secondary closed position and temporarily at the secondary closed position.

Figure 24:
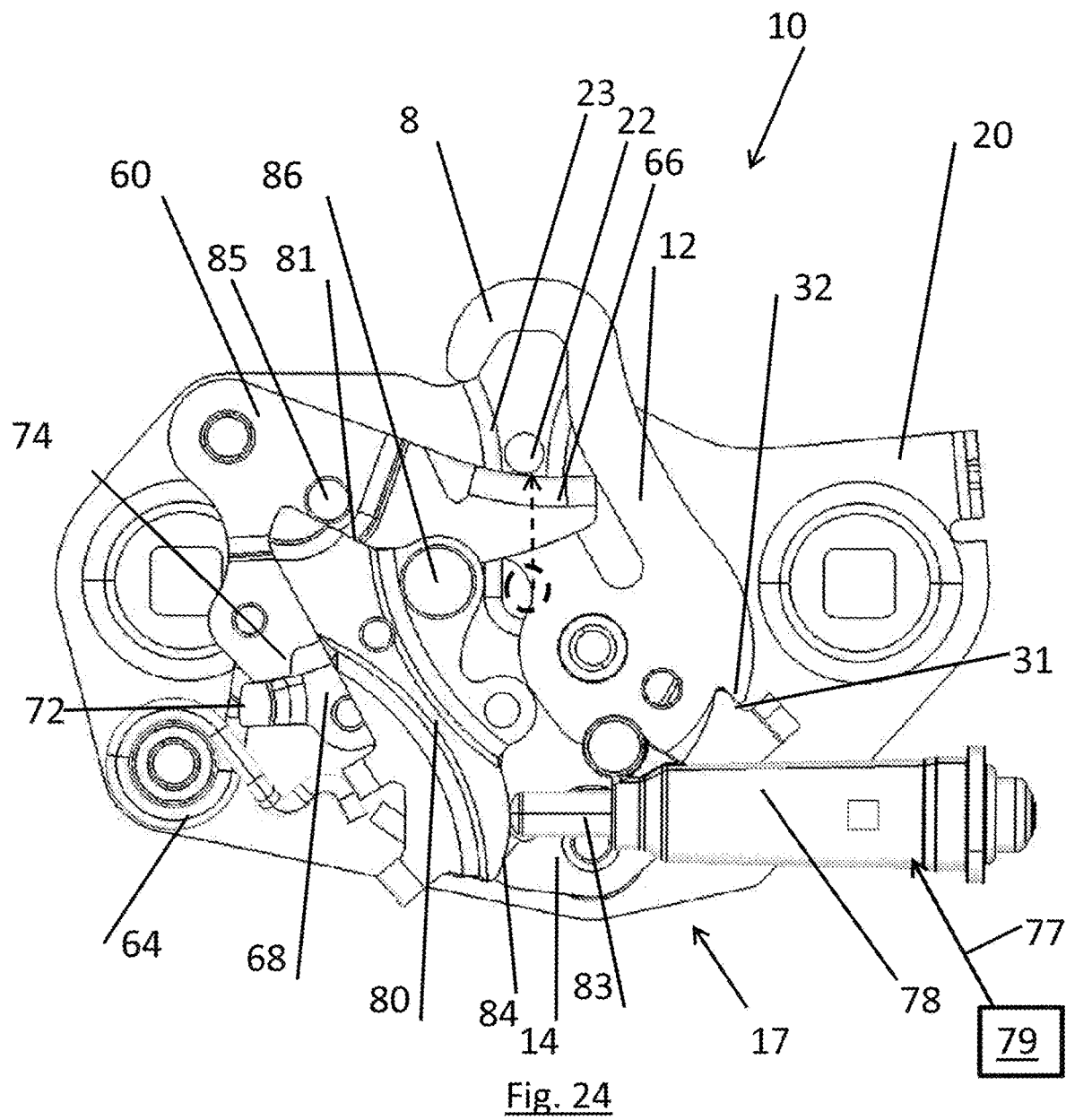
FIG. 24 is a plan view of the latch of FIG. 22 temporarily at the secondary closed position.

Referring to FIG. 24, shown is the striker 22 in secondary position with the primary position shown in ghosted view. In this secondary position, the ratchet 12 has become restricted from further travel (i.e. rotation) due to alignment by the operated release mechanism 17 of the pawl 14 with the secondary locking surface 32 of the ratchet 12. Also, while the pawl 14 is engaged with the secondary locking surface 32, the operated release mechanism 17 facilitates the misalignment between the stop 74 and the lock surface 72 to provide for further unrestricted travel of the lift lever 60 through the secondary position and onto the actuated position of FIG. 25, as the lift lock lever 68 remains disengaged from the lift lever 60 under influence of the actuation mechanism 80 and/or position of the lift lever 60. It is noted that the hook portion 8 is maintained in position to inhibit unrestrained exit of the striker 22 from the fishmouth 23. Thus similar to the embodiment of FIG. 19, the secondary position is defined as a secondary closed position as the hook portion 8 is positioned in the secondary closed position across the fishmouth 23 and thus restricts unrestrained exit of the striker from the fishmouth 23.

Figure 25:
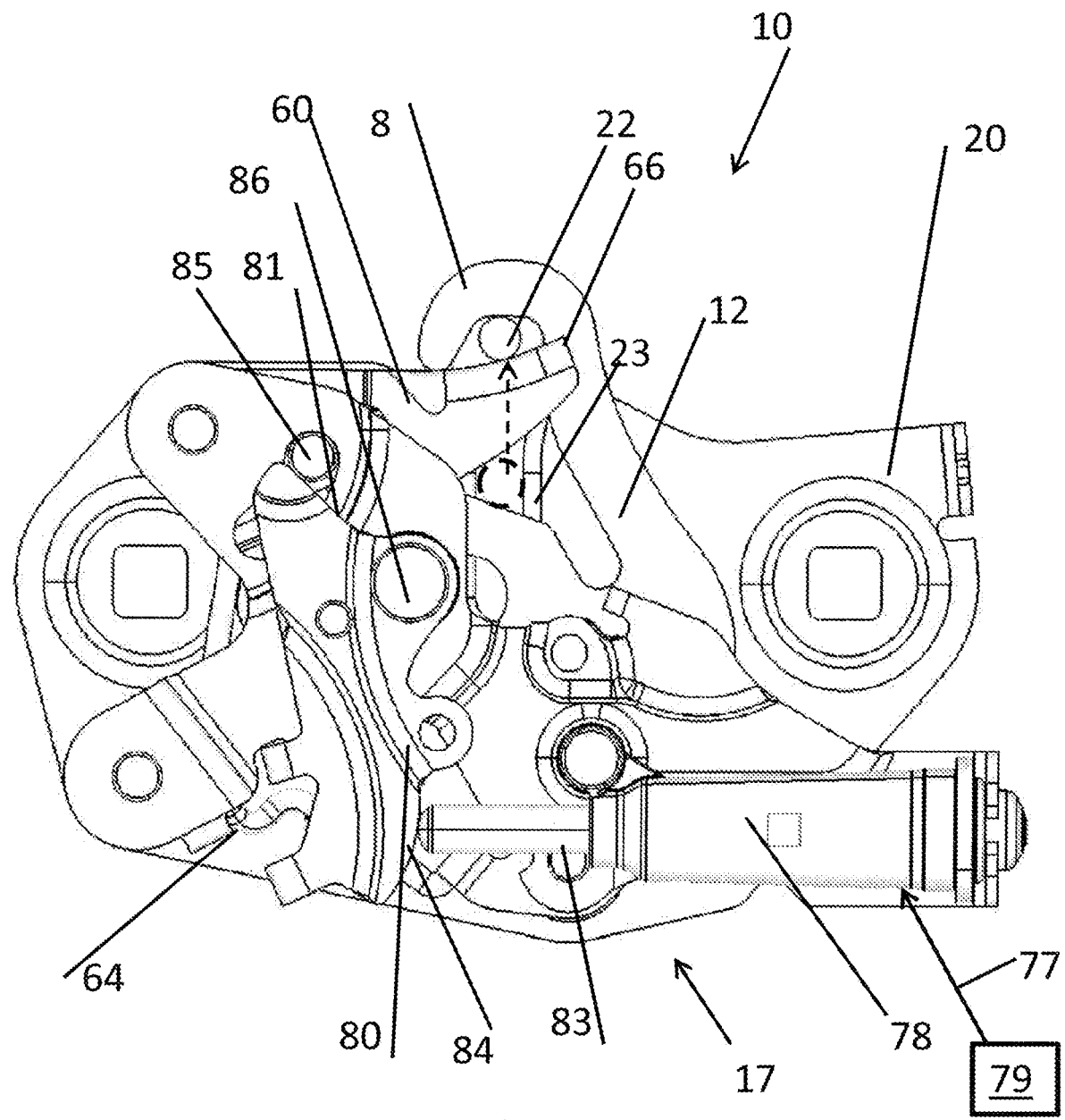
FIG. 25 is a plan view of the latch of FIG. 22 at an actuated closed position.

Referring to FIG. 25, the lift lever 60 under influence of the actuation mechanism 80 as actuated by the actuator 78 has lifted the striker 22 from the secondary position (shown in ghosted view) to the actuated position. It is noted that the actuated position shown in FIG. 25 is further from the primary position (see FIG. 22) as compared to the third or open position shown in FIG. 20. It is recognized that the elevated position of the striker 22 shown in FIG. 20 is for the purposes of visual indication to the occupant that the latch 10 is in an open state (e.g. that both first and second actuations of the operated release mechanism 17 has resulted in placing the latch 10 from the primary position to the open or third position). The greater elevated position of the striker 22 in FIG. 25 over that of the striker in FIG. 20 is for the purpose of providing a greater separation between the hood 13 (see FIG. 1) and the engine of the engine compartment, thus providing for a defined separation between the hood in the actuated position and the hood 13 in the primary position (e.g. difference in position of the striker 22 between the primary position and the elevated position).

It is also recognized that in the actuated position, the striker 22 still remains restrained by the hook portion 8 from exiting the fishmouth 23. An advantage of this restraint is that during a crash condition, as sensed by the sensing system 79, the hood 13 remains partially closed and in a measured elevated position with respect to the primary position in the event a pedestrian impacts the hood 13.

Figure 26:
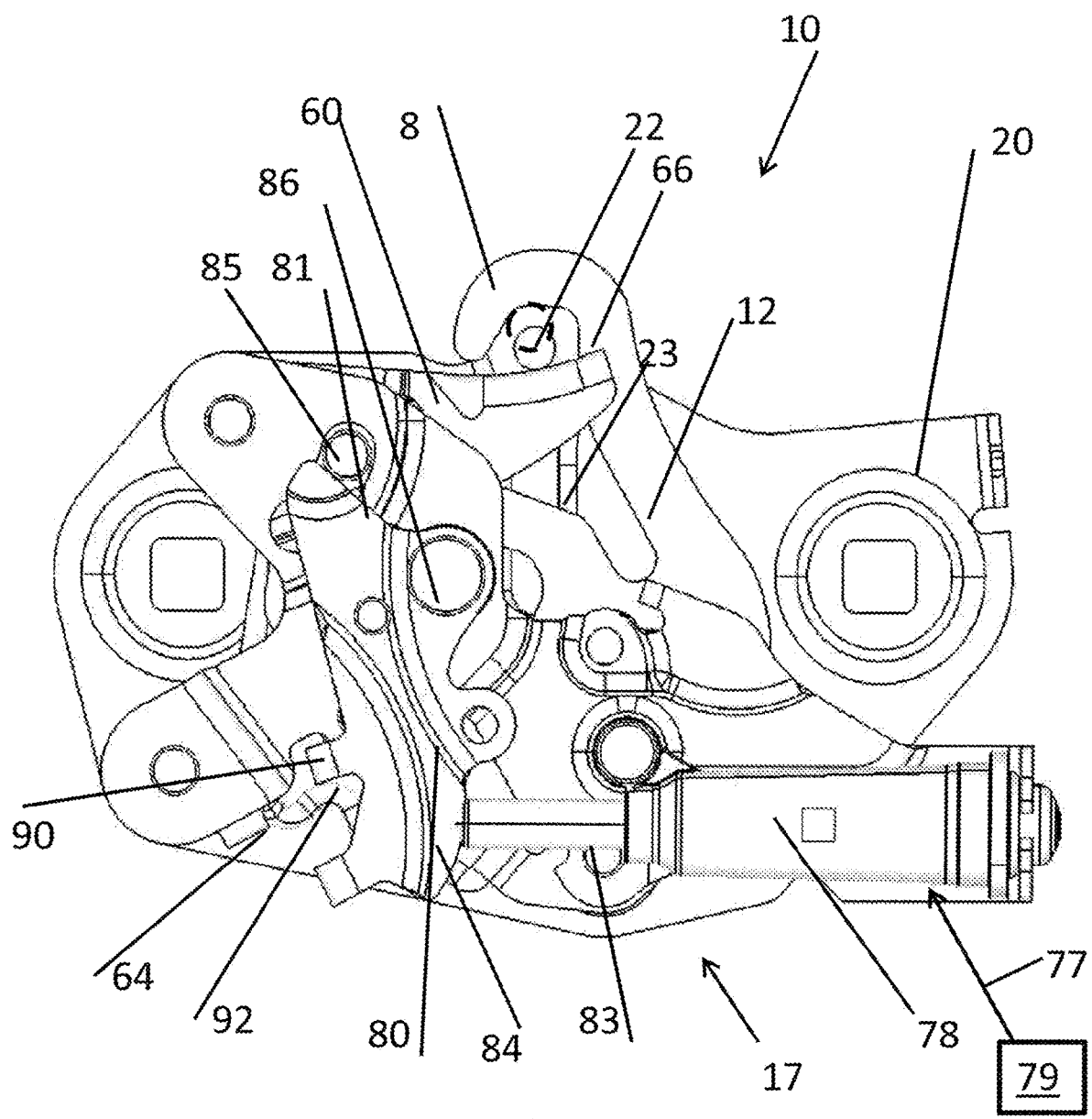
FIG. 26 is a plan view of the latch of FIG. 22 at a retained closed position.

Referring to FIG. 26, shown is the striker 22 in a retained position after actuation by the actuator 78 has finished. In this retained position (as compared to the actuated position of the striker 22 shown in ghosted view), a tab 90 of the actuation mechanism 80 is supported on a resilient member 92 connected to the housing 20. The resilient member 92 (e.g. a leg extension of the biasing member 64) is configured to lock and support the weight of the hood 13 and a predetermined maximum load from the pedestrian (in the event of impact of the pedestrian with the hood 13). For example, the resilient member 92 holds the actuation mechanism 80 at or near the actuated position by maintaining engagement between the portion 85 of the lift lever 60 and the actuation surface 81 of the actuation mechanism 80.

In view of the above, it is recognized that the actuation mechanism 80 is shown by example as a lever, however other configurations (e.g. multiple levers, springs, gears, and other mechanical elements) can be used to transfer the force of the actuator 78 to the lift lever 60, while providing for locking of the ratchet 12 in the secondary position while providing for bypass of locking engagement of the lift lever 60 in the secondary position. Further, it is recognized that manufacturing and/or positioning tolerances can vary the level of actual contact (or not) between the locking surfaces 32,31 of the ratchet 12 and the pawl 14 when in the secondary position.

In general, the actuator 78 can provide a source of mechanical potential energy for actuation of the actuation mechanism 80, which can be defined as potential energy of an object (or objects) in the system due to the position of the object(s) within the system. As discussed above, the latch 10 is one example configuration using mechanical potential energy stored in the actuator 78 to operate the latch 10 to one or more positions between the primary position to the open position (one example is where the mechanical potential energy is used to help force a latch component (e.g. striker) from the primary position to the secondary position.

Examples of mechanical potential energy of the actuator 78 are energy associated with restoring forces of a force field, such as a biasing element (e.g. spring) or the force of gravity. As such, the action of stretching/compressing the object (e.g. biasing element) or lifting the object (e.g. a weight) is performed by an external force that works against a force field of the respective potential and thereby changes the portion of the object from a first position to a second position within the force field. This work is stored in the force field, which is said to be stored as the mechanical potential energy of the actuator 78. If the external force is removed (e.g. removal of the element of the system holding the object at the second position), the force field acts on the object to perform the work as it moves the object back to the initial position, e.g. reducing the stretch/compression of the object (e.g. spring) or causing the object (e.g. a weighted body) to fall. Accordingly, the mechanical potential energy can be defined as the energy difference between the potential energy of the object in a given position (e.g. second position) and its energy at a reference position (e.g. first position), such that release of the stored mechanical potential energy is a consequence of the object returning from the second position to the first position. One example release mechanism for the object in the actuator 78 is the sensor signal 77.

As discussed above, gravitational energy is an example of the mechanical potential energy associated with gravitational force, as work is required to elevate object(s) (e.g. weight) against Earth's gravity (i.e. force field). The mechanical potential energy due to elevated positions is called gravitational potential energy. A further example of the mechanical potential energy is elastic energy, which can be defined as the mechanical potential energy of an elastic object (e.g. a biasing element such as a spring, a band, etc that can be compressed or stretched from a first position to a second position) that is deformed under tension or compression (or stressed). The elastic energy arises as a consequence of the force of the elastic object that tries to restore the object to its original shape. For example, if a stretched/compressed position (e.g. second position) of the elastic object is released, the energy can be transformed into kinetic energy as the elastic object returns to its original shape at the unstretched/uncompressed position (first position), also referred to as a reference position. An example of a biasing element (e.g. also referred to as elastic object) can be a spring, such that when the spring is compressed or stretched, the force it exerts is proportional to its change in length. The rate or spring constant of the spring is the change in the force it exerts, divided by the change in deflection of the spring. Springs can be classified depending on how the load force is applied to them, such as but not limited to: tension/extension spring designed to operate with a tension load so the spring stretches as the load is applied to it; compression spring designed to operate with a compression load so the spring gets shorter as the load is applied to it; torsion spring, where unlike the load as an axial force, the load is applied as a torque or twisting force and the end of the spring rotates through an angle as the load is applied; constant spring such that the supported load will remain the same throughout deflection cycle; variable spring where resistance of the spring coil to load varies during compression; coil spring made of a coil or helix of wire which are types of torsion spring because the spring wire itself is twisted when the spring is compressed or stretched; flat spring made of a flat or conical shaped piece of metal or other material capable of elastic deformation; machined spring manufactured by machining bar stock with a lathe and/or milling operation rather than coiling wire; and cantilever spring which is fixed only at one end; torsion spring designed to be twisted rather than compressed or extended.

It is further noted that the actuator 78 can contain stored chemical potential energy rather than mechanical potential energy. Chemical potential energy can be defined as the kind of potential energy stored in chemical bonds, such that chemical energy of a chemical substance can be transformed to other forms of energy by a chemical reaction. As an example, when a fuel is burned the chemical energy is converted to heat energy and light energy. As such, the potential energy of the actuator 78 can be used, once released by the sensor signal 77, to actuate the actuation mechanism 80 and thus move the striker 22 from the primary position to the actuated position.

While the above description constitutes a plurality of embodiments, it will be appreciated that the present disclosure is susceptible to further modification and change without departing from the fair meaning of the accompanying claims.

The invention claimed is:

1. A latch for cooperating with a striker comprising:
   a ratchet movable about a pivot between a primary closed position, a secondary closed position and an open position, wherein the ratchet is biased towards the open position about the pivot for facilitating travel of the striker in a fishmouth of the latch from the primary closed position to the open position, the ratchet contacting and holding the striker at a first depth in the fishmouth when the ratchet is in the primary closed position by restraining the striker by the fishmouth from moving to a second depth and the ratchet contacting and holding the striker at the second depth in the fishmouth by restraining the striker by the fishmouth from moving away from the second depth and to the open position when the ratchet is in the secondary closed position, the first depth further from the open position than the second depth, such that the striker is restrained by the fishmouth from moving to the open position when the striker is contacting the ratchet in the fishmouth at both the first depth and at the second depth;
   a pawl movable between a primary locking position, a secondary locking position and an unlocking position, wherein the pawl is biased towards the primary locking position, in the primary closed position the pawl has a pawl locking surface for engaging a primary locking surface on the ratchet and holding the ratchet in the primary closed position and in the secondary closed position the pawl has the pawl locking surface for engaging a secondary locking surface on the ratchet holding the ratchet in the secondary closed position;
   a lift lever biased towards the open position and having a lift surface for moving the striker in the fishmouth away from the secondary closed position and towards the open position when the pawl is in the unlocking position; and
   a lift lock lever for engagement with the lift lever for holding the lift lever in the secondary closed position and for disengaging from the lift lever to provide for said moving of the striker from the secondary closed position and towards the open position;
   wherein the striker is further from the primary closed position when in the open position than when the striker is in the secondary closed position.

2. The latch of claim 1 further comprising a hook portion positioned to restrain exit of the striker from the fishmouth when the ratchet is in the primary closed position and when in the secondary closed position, while providing for unrestrained exit of the striker from the fishmouth when the ratchet is in the open position.

3. The latch of claim 2, wherein the hook portion is part of the ratchet.

4. A latch for cooperating with a striker comprising:
   a ratchet movable between a primary closed position, a secondary closed position and an actuated position, wherein the ratchet is biased towards the actuated position for facilitating travel of the striker in a fishmouth of the latch to the secondary closed position, the ratchet contacting and holding the striker at a first depth in the fishmouth when the ratchet is in the primary closed position and the ratchet contacting and holding the striker at a second depth in the fishmouth when the ratchet is in the secondary closed position, the first depth further from the actuated position than the second depth, such that the striker is restrained by the fishmouth from moving to the actuated position when the striker is contacting the ratchet in the fishmouth at both the first depth and at the second depth;
   a pawl movable between a primary locking position and a secondary locking position, wherein the pawl is biased towards the primary locking position, in the primary closed position the pawl has a pawl locking surface for engaging a primary locking surface on the ratchet and holding the ratchet in the primary closed position and in the secondary closed position the pawl has the pawl locking surface for engaging a secondary locking surface on the ratchet holding the ratchet in the secondary closed position;
   a lift lever biased towards the actuated position and having a lift surface for moving the striker in the fishmouth away from the secondary closed position and towards the actuated position when the pawl is in the secondary closed position; and
   a lift lock lever for engagement with the lift lever for holding the lift lever in the secondary closed position and for disengaging from the lift lever to provide for said moving of the striker from the secondary closed position and towards the actuated position;
   wherein the striker is further from the primary closed position in the actuated position than when the striker is in the secondary closed position.

5. The latch of claim 1 further comprising an actuation mechanism actuated by an actuator, the actuation mechanism for assisting said travel of the striker in the fishmouth by moving the lift lever.

6. The latch of claim 4 further comprising a hook portion positioned to restrain exit of the striker from the fishmouth when the lift lever is in the primary closed position, when the lift lever is in the secondary closed position and when the lift lever is in the actuated position.

7. The latch of claim 6, wherein the hook portion is part of the ratchet.

8. The latch of claim 4, wherein the actuation mechanism is configured to restrict the lift lock lever from engagement with the lift lever when the lift lever is in the secondary closed position to provide for unrestrained moving of the striker from the primary closed position to the actuated position.

9. The latch of claim 4 further comprising a resilient member for retaining the lift lever at or near the actuated position.

10. The latch of claim 5, wherein the actuator and actuation mechanism are part of an active pedestrian protection system.

\* \* \* \* \*